United States Patent
Van Nee et al.

(10) Patent No.: US 11,102,036 B2
(45) Date of Patent: Aug. 24, 2021

(54) PREAMBLE DESIGN FOR WAKE-UP SIGNALS

(71) Applicant: QUALCOMM Incorporated, San Diego, CA (US)

(72) Inventors: Didier Johannes Richard Van Nee, Tull en 't Waal (NL); Geert Arnout Awater, Groenekan (NL); Maarten Menzo Wentink, Nijmegen (NL); Albert Van Zelst, Woerden (NL); Bin Tian, San Diego, CA (US); Stephen Jay Shellhammer, Ramona, CA (US); Nitin Ravinder, San Diego, CA (US); Muhammed Faruk Gencel, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/806,126

(22) Filed: Mar. 2, 2020

(65) Prior Publication Data
US 2020/0287759 A1 Sep. 10, 2020

Related U.S. Application Data

(60) Provisional application No. 62/815,836, filed on Mar. 8, 2019.

(51) Int. Cl.
*H04L 27/06* (2006.01)
*H04W 52/02* (2009.01)
*H04L 27/26* (2006.01)

(52) U.S. Cl.
CPC .......... *H04L 27/06* (2013.01); *H04L 27/2608* (2013.01); *H04L 27/2692* (2013.01); *H04W 52/0229* (2013.01)

(58) Field of Classification Search
CPC .... H04W 52/0229; H04L 27/02; H04L 27/04; H04L 27/0008; H04L 27/06; H04L 27/2692; H04L 1/0005; H04L 27/2608
See application file for complete search history.

(56) References Cited

U.S. PATENT DOCUMENTS

2020/0137686 A1* 4/2020 Cao .................. H04W 52/0235

OTHER PUBLICATIONS 802 11 Working Group of the LAN/MAN Standards Committee? of the ? IEEE Computer Society: "Draft Standard for Information technology—Telecommunications and Information Exchange Between Systems Local and Metropolitan Area Networks—Specific Requirements ? ? Part 11: Wireless LAN Medium Access Control ? (MAC) and Physical Layer (PHY) Specifications ? ? Amendment 4: Wake-Up Radio Operatic", IEEE Draft, Draft P802.11BA D2.0, IEEE-SA, Piscataway, NJ USA, vol. 802.11ba drafts, No. D2.0 Jan. 30, 2019 (Jan. 30, 2019), pp. 1-130, XP068149544, Retrieved from the Internet: URL: http://www.ieee802.org/11/private/Draft_Standards/11ba/Draft P802.11ba D2.0.pdf. [retrieved on Jan. 30, 2019] figures 31-1, 31-10 paragraph [31.2.1] paragraph [31.2.5.4]-paragraph [31.2.5.8] paragraph [31.2.4.1] paragraph [31.2.9.1] paragraph [31.2.7]-paragraph [31.2.8] tables 31-3, 31-4.

(Continued)

Primary Examiner — Rahel Guarino
(74) Attorney, Agent, or Firm — Kevin M. Donnelly

(57) ABSTRACT

This disclosure provides methods, devices and systems for identifying wake-up signals. Some implementations more specifically relate to PHY preamble designs for wake-up signals such as Wake-Up Radio (WUR) packets conforming to IEEE 802.11ba. In some implementations, the preamble designs can include a combination of modulation schemes, data rate indications and length indications enabling devices capable of receiving and decoding wake-up signals to identify the signals as wake-up signals (for example, WUR packets), while ensuring that devices not capable of receiv- (Continued)

ing and decoding wake-up signals identify the wake-up signals as legacy packets, or otherwise not WUR packets.

26 Claims, 20 Drawing Sheets

(56) References Cited

OTHER PUBLICATIONS

International Search Report and Written Opinion—PCT/US2020/020984—ISA/EPO—dated Jun. 19, 2020.
Shellhammer S., (Qualcomm): Proposed Draft WUR PHY Specification, IEEE Draft, 11-18-0152-05-00BA-Proposed-Draft-WUR-PHY-Specification, IEEE-SA Mentor, Piscataway, NJ, USA, vol. 802.11ba, No. 5, Jan. 18, 2018 (Jan. 18, 2018), pp. 1-15, XP068122896, Retrieved from the Internet: URL: https://mentor.ieee.org/802.11/dcn/18/11-18-0152-05-00ba-proposed-draft-wur-phy-specification.docx. [retrieved on Jan. 18, 2018] figures 32-A paragraph [32.3.1]-paragraph [32.3.8.1].

* cited by examiner

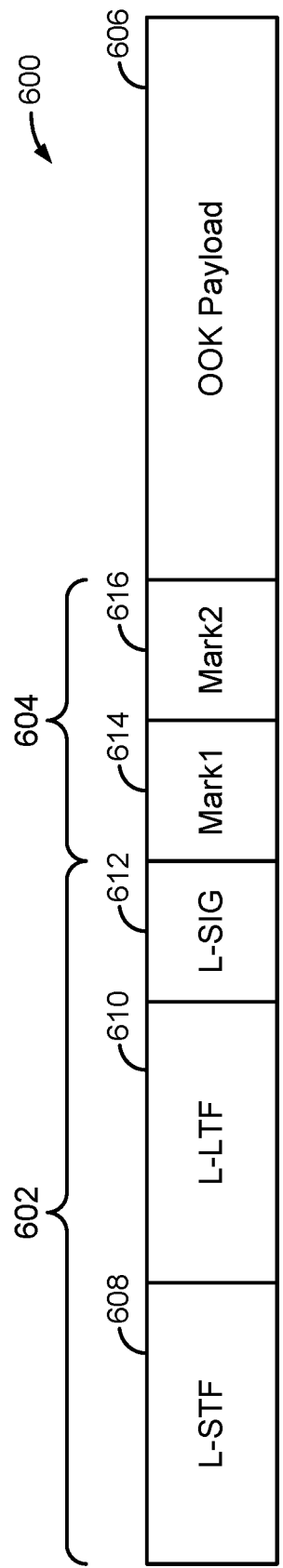
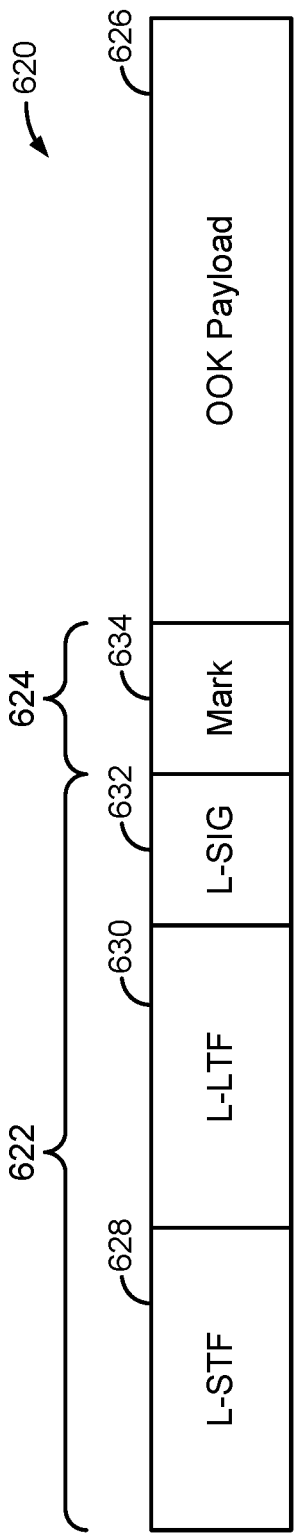
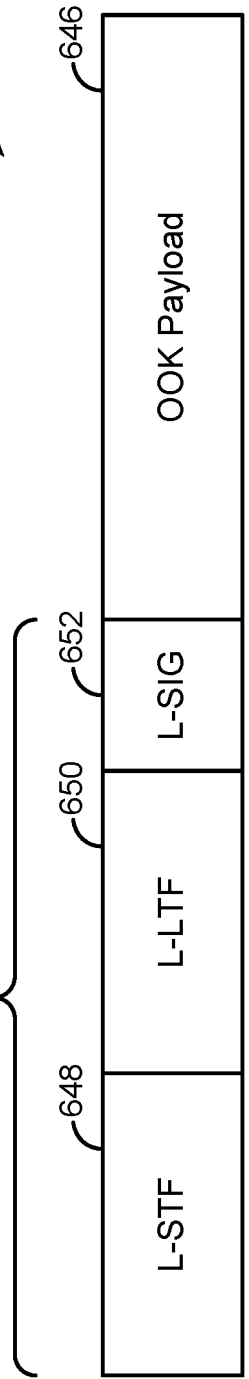
Figure 6A
Figure 6B
Figure 6C

PREAMBLE DESIGN FOR WAKE-UP SIGNALS

PRIORITY INFORMATION

This patent application claims priority under 35 U.S.C. 119(e) to U.S. provisional patent application Ser. No. 62/815,836 entitled "Preamble Design for Wake-Up Signals" and filed on 8 Mar. 2019, the content of which is hereby incorporated by reference herein for all purposes.

TECHNICAL FIELD

This disclosure relates generally to wireless communication, and more specifically, to preamble designs for wake-up signals.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

Some APs and STAs may be configured to transmit and receive wake-up signals, respectively. For example, an AP may transmit a wake-up signal to a STA to cause the STA to wake up, turn on, activate or otherwise enable a primary radio from a sleep, off, low-power or deactivated state in which the primary radio is disabled from transmitting or receiving signals to or from other wireless communication devices. For example, the AP may determine that it has data to send to the STA and subsequently transmit a wake-up signal to cause the STA to activate its primary radio such that it can receive data from the AP. The STA monitors for wake-up signals using a secondary, low-power radio (also referred to as a "wake-up radio"). For example, the secondary radio may have an active power consumption that is less than 1 milliwatt (mW) in some implementations. Using the secondary radio enables the STA to sleep or otherwise be in a low-power state in which its primary radio is deactivated while still monitoring for signals using the secondary radio thereby reducing overall power consumption.

SUMMARY

The systems, methods and devices of this disclosure each have several innovative aspects, no single one of which is solely responsible for the desirable attributes disclosed herein.

This disclosure provides methods, devices and systems for identifying wake-up signals. Some implementations more specifically relate to PHY preamble designs for wake-up signals such as Wake-Up Radio (WUR) packets conforming to IEEE 802.11ba. In some implementations, the preamble designs can include a combination of modulation schemes, data rate indications and length indications enabling devices capable of receiving and decoding wake-up signals to identify the signals as wake-up signals (for example, WUR packets), while ensuring that devices not capable of receiving and decoding wake-up signals identify the wake-up signals as legacy packets, or otherwise not WUR packets.

One innovative aspect of the subject matter described in this disclosure can be implemented in a method for wireless communication. The method includes generating a physical layer preamble of a packet, the physical layer preamble including a first portion and a second portion, the first portion including one or more symbols, the second portion including two or more symbols. The method also includes modulating each of the one or more symbols in the first portion according to a binary phase shift keying (BPSK) modulation scheme and modulating the first two symbols in the second portion immediately following the last symbol in the first portion according to a BPSK modulation scheme. The method additionally includes generating a physical layer payload of the packet including a plurality of symbols and modulating the plurality of symbols in the payload according to a multicarrier on-off keying (MC-OOK) modulation scheme. The method further includes outputting the modulated packet for transmission to at least one wireless communication device.

Another innovative aspect of the subject matter described in this disclosure can be implemented in a method for wireless communication. The method includes generating a physical layer preamble of a packet, the physical layer preamble including a first portion and a second portion, the first portion including a plurality of symbols, the second portion including one or more symbols. The plurality of symbols in the first portion define at least a data rate field and a length field, the data rate field indicating a data rate of 6 Megabits per second (Mbps) and the length field indicating a modulus 3 of 1 or 2. The method also includes modulating each of the plurality of symbols in the first portion according to a BPSK modulation scheme and modulating the first symbol in the second portion immediately following the last symbol in the first portion according to a BPSK modulation scheme. While both are modulated according to a BPSK modulation scheme, the modulation of the first symbol in the second portion uses a different waveform than the waveform used to modulate the last symbol in the first portion. The method additionally includes generating a physical layer payload of the packet including a plurality of symbols and modulating the plurality of symbols in the payload according to a MC-OOK modulation scheme. The method further includes outputting the modulated packet for transmission to at least one wireless communication device.

Another innovative aspect of the subject matter described in this disclosure can be implemented in a method for wireless communication. The method includes generating a physical layer preamble of a packet including a plurality of symbols, the physical layer preamble including a data rate field that indicates a data rate of 9 Mbps. The method also includes modulating each of the plurality of symbols in the physical layer preamble according to a BPSK modulation scheme. The method additionally includes generating a physical layer payload of the packet including a plurality of symbols and modulating the plurality of symbols in the payload according to an MC-OOK modulation scheme. The method further includes outputting the modulated packet for transmission to at least one wireless communication device.

Another innovative aspect of the subject matter described in this disclosure can be implemented in a method for wireless communication. The method includes generating a physical layer preamble of a packet, the physical layer preamble including a first portion and a second portion, the first portion including a plurality of symbols, the second portion including one or more symbols. The method also includes modulating each of the plurality of symbols in the first portion according to a BPSK modulation scheme and modulating at least the first symbol in the second portion immediately following the last symbol in the first portion according to a quadrature BPSK (Q-BPSK) modulation scheme. The method additionally includes generating a physical layer payload of the packet including a plurality of symbols and modulating the plurality of symbols in the payload according to an MC-OOK modulation scheme. The method further includes outputting the modulated packet for transmission to at least one wireless communication device.

Another innovative aspect of the subject matter described in this disclosure can be implemented in a method for wireless communication. The method includes generating a physical layer preamble of a packet, the physical layer preamble including a first portion and a second portion, the first portion including a plurality of symbols, the second portion including a plurality of symbols. The method also includes modulating each of the plurality of symbols in the first portion according to a BPSK modulation scheme, modulating the first symbol in the second portion immediately following the last symbol in the first portion according to a BPSK modulation scheme and modulating the second symbol in the second portion according to a Q-BPSK modulation scheme. The method additionally includes generating a physical layer payload of the packet including a plurality of symbols and modulating the plurality of symbols in the payload according to an MC-OOK modulation scheme. The method further includes outputting the modulated packet for transmission to at least one wireless communication device.

Another innovative aspect of the subject matter described in this disclosure can be implemented in a method for wireless communication. The method includes generating a physical layer preamble of a packet, the physical layer preamble including a first portion and a second portion, the first portion including a plurality of symbols, the second portion including one or more symbols, the first symbol in the second portion being identical to the last symbol in the first portion. The method also includes modulating each of the plurality of symbols in the first portion according to a BPSK modulation scheme and modulating the first symbol in the second portion according to a BPSK modulation scheme. The method additionally includes generating a physical layer payload of the packet including a plurality of symbols and modulating the plurality of symbols in the payload according to an MC-OOK modulation scheme. The method further includes outputting the modulated packet for transmission to at least one wireless communication device.

Another innovative aspect of the subject matter described in this disclosure can be implemented in a method for wireless communication. The method includes receiving a packet from a second wireless communication device via a first radio, the packet including a physical layer preamble including a first portion and a second portion, the first portion including one or more symbols, the second portion including two or more symbols. Each of the one or more symbols in the first portion is modulated according to a BPSK modulation scheme and the first two symbols in the second portion immediately following the last symbol in the first portion is modulated according to a BPSK modulation scheme. The packet further includes a physical layer payload including a plurality of symbols, the plurality of symbols in the payload being modulated according to an MC-OOK modulation scheme. The method also includes determining a packet type of the packet based at least in part on the modulation in the first portion and the modulation in the second portion.

Another innovative aspect of the subject matter described in this disclosure can be implemented in a method for wireless communication. The method includes receiving a packet from a second wireless communication device via a first radio, the packet including a physical layer preamble including a first portion and a second portion, the first portion including a plurality of symbols, the second portion including one or more symbols. The plurality of symbols in the first portion define at least a data rate field and a length field, the data rate field indicating a data rate of 6 Mbps and the length field indicating a modulus 3 of 1 or 2. Each of the plurality of symbols in the first portion is modulated according to a BPSK modulation scheme and the first symbol in the second portion immediately following the last symbol in the first portion is modulated according to a BPSK modulation scheme. While both are modulated according to a BPSK modulation scheme, the first symbol in the second portion is modulated using a different waveform than the waveform used to modulate the last symbol in the first portion. The packet further includes a physical layer payload including a plurality of symbols, the plurality of symbols in the payload being modulated according to an MC-OOK modulation scheme. The method also includes determining a packet type of the packet based at least in part on the modulation in the first portion, the modulation in the second portion, the data rate field and the length field.

Another innovative aspect of the subject matter described in this disclosure can be implemented in a method for wireless communication. The method includes receiving a packet from a second wireless communication device via a first radio, the packet including a physical layer preamble including a plurality of symbols, the physical layer preamble including a data rate field that indicates a data rate of 9 Mbps, each of the plurality of symbols in the physical layer preamble being modulated according to a BPSK modulation scheme. The packet further includes a physical layer payload including a plurality of symbols, the plurality of symbols in the payload being modulated according to an MC-OOK modulation scheme. The method also includes determining a packet type of the packet based at least in part on the modulation in the first portion and the data rate field.

Another innovative aspect of the subject matter described in this disclosure can be implemented in a method for wireless communication. The method includes receiving a packet from a second wireless communication device via a first radio, the packet including a physical layer preamble including a first portion and a second portion, the first portion including a plurality of symbols, the second portion including one or more symbols. Each of the plurality of symbols in the first portion is modulated according to a BPSK modulation scheme and at least the first symbol in the second portion immediately following the last symbol in the first portion is modulated according to a Q-BPSK modulation scheme. The packet further includes a physical layer payload including a plurality of symbols, the plurality of symbols in the payload being modulated according to an MC-OOK modulation scheme. The method also includes determining a packet type of the packet based at least in part on the modulation in the first portion and the modulation in the second portion.

Another innovative aspect of the subject matter described in this disclosure can be implemented in a method for wireless communication. The method includes receiving a packet from a second wireless communication device via a first radio, the packet including a physical layer preamble including a first portion and a second portion, the first portion including a plurality of symbols, the second portion including a plurality of symbols. Each of the plurality of symbols in the first portion is modulated according to a BPSK modulation scheme, the first symbol in the second portion immediately following the last symbol in the first portion is modulated according to a BPSK modulation scheme, and the second symbol in the second portion is modulated according to a Q-BPSK modulation scheme. The packet further includes a physical layer payload including a plurality of symbols, the plurality of symbols in the payload being modulated according to an MC-OOK modulation scheme. The method also includes determining a packet type of the packet based at least in part on the modulation in the first portion and the modulation in the second portion.

Another innovative aspect of the subject matter described in this disclosure can be implemented in a method for wireless communication. The method includes receiving a packet from a second wireless communication device via a first radio, the packet including a physical layer preamble including a first portion and a second portion, the first portion including a plurality of symbols, the second portion including one or more symbols, the first symbol in the second portion being identical to the last symbol in the first portion. Each of the plurality of symbols in the first portion is modulated according to a BPSK modulation scheme, and the first symbol in the second portion is modulated according to a BPSK modulation scheme. The packet further includes a physical layer payload including a plurality of symbols, the plurality of symbols in the payload being modulated according to an MC-OOK modulation scheme. The method also includes determining a packet type of the packet based at least in part on the modulation in the first portion and the modulation in the second portion.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 6A shows an example PDU for transmitting a wake-up radio frame according to some implementations.

FIG. 6B shows another example PDU for transmitting a wake-up radio frame according to some implementations.

FIG. 6C shows another example PDU for transmitting a wake-up radio frame according to some implementations.

Like reference numbers and designations in the various drawings indicate like elements.

DETAILED DESCRIPTION

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Various implementations relate generally to the techniques for identifying wake-up signals. Some implementations more specifically relate to PHY preamble designs for wake-up signals such as WUR packets conforming to IEEE 802.11ba. In some implementations, the preamble designs can include a combination of modulation schemes, data rate indications and length indications enabling devices capable of receiving and decoding wake-up signals to identify the signals as wake-up signals (for example, WUR packets), while ensuring that devices not capable of receiving and decoding wake-up signals identify the wake-up signals as legacy packets, or otherwise not WUR packets.

Figure 1:
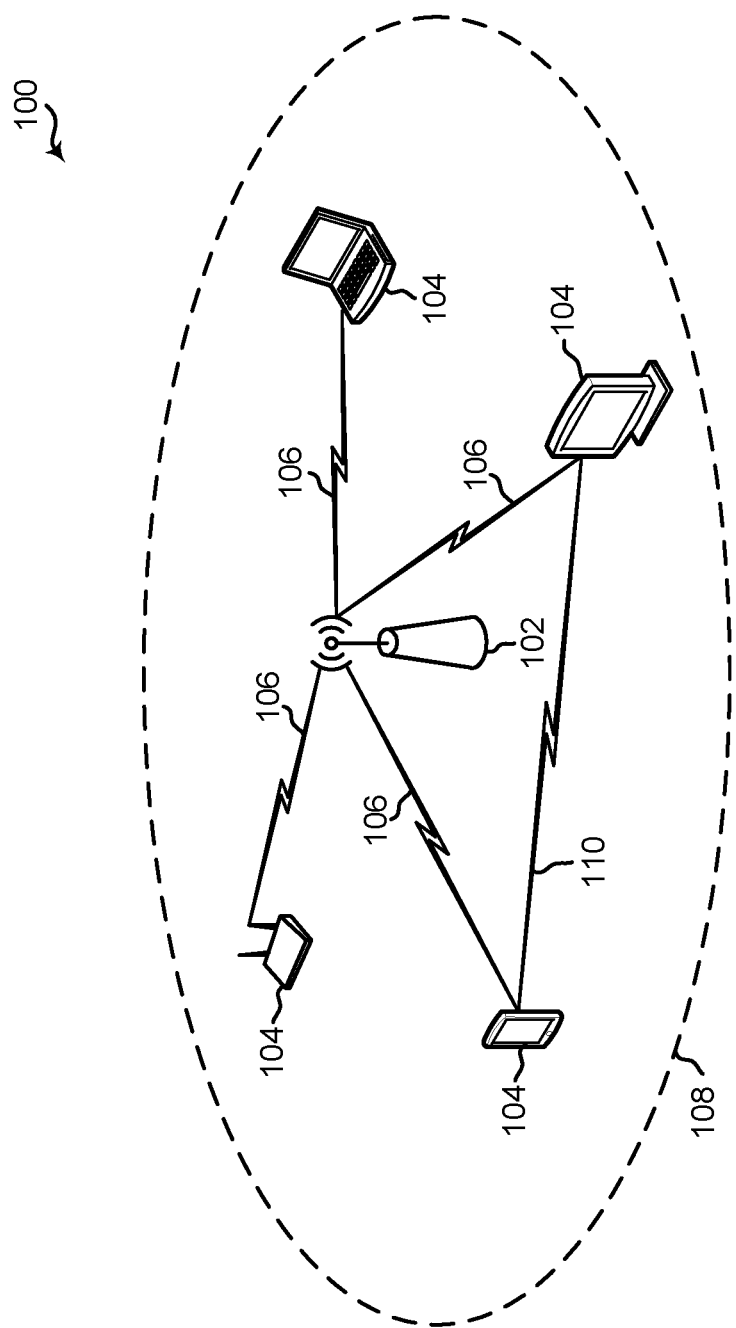
FIG. 1 shows a pictorial diagram of an example wireless communication network.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of standards (such as that defined by the IEEE 802.11-2016 specification or amendments thereof including, but not limited to, 802.11ah, 802.11ad, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (s)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many B15 within range of the STA or to select among multiple APs 102 that together form an extended service set (ESS) including multiple connected B15. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 108, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of standards (such as that defined by the IEEE 802.11-2016 specification or amendments thereof including, but not limited to, 802.11ah, 802.11ad, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac and 802.11ax standard amendments may be transmitted over the 2.4 and 5 GHz bands, each of which is divided into multiple 20 MHz channels. As such, these PPDUs are transmitted over a physical channel having a minimum bandwidth of 20 MHz. But larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a PLCP service data unit (PSDU). The information provided in the preamble may be used by a receiving device to decode the subsequent data in the PSDU. A legacy portion of the preamble may include a legacy short training field (STF) (L-STF), a legacy long training field (LTF) (L-LTF), and a legacy signaling field (L-SIG). The legacy preamble may be used for packet detection, automatic gain control and channel estimation, among other uses. The legacy preamble also may be used to maintain compatibility with legacy devices. In instances in which PPDUs are transmitted over a bonded channel, the L-STF, L-LTF, and L-SIG fields may be duplicated and transmitted in each of the multiple component channels. For example, in IEEE 802.11n, 802.11ac or 802.11ax implementations, the L-STF, L-LTF, and L-SIG fields may be duplicated and transmitted in each of the component 20 MHz channels. The format of, coding of, and information provided in the non-legacy portion of the preamble is based on the particular IEEE 802.11 protocol.

Figure 2A:
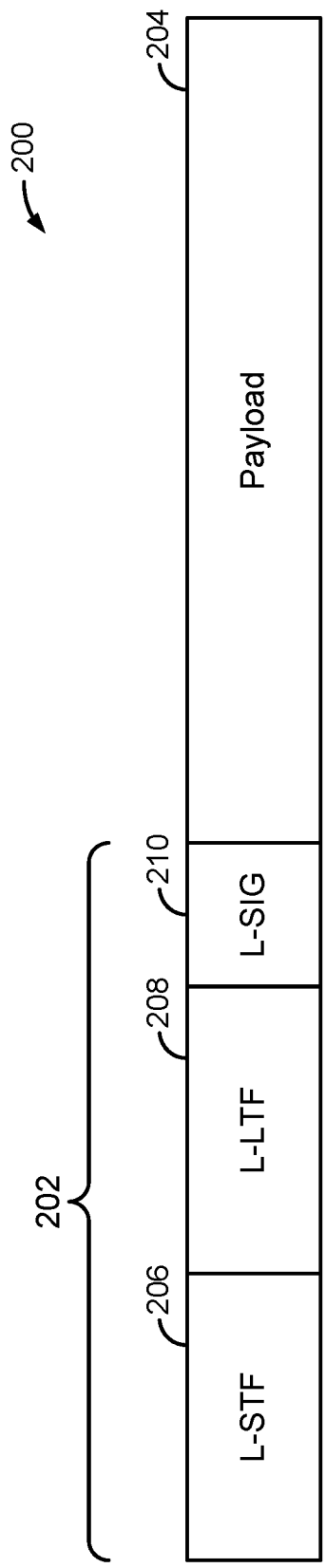
FIG. 2A shows an example protocol data unit (PDU) usable for communications between an access point (AP) and a number of stations (STAs).

FIG. 2A shows an example protocol data unit (PDU) 200 usable for communications between an AP and a number of STAs. For example, the PDU 200 can be configured as a PPDU. As shown, the PDU 200 includes a PHY preamble 202 and a PHY payload 204. For example, the PHY preamble 202 may include a legacy portion that itself includes a legacy short training field (L-STF) 206, a legacy long training field (L-LTF) 208, and a legacy signaling field (L-SIG) 210. The PHY preamble 202 may also include a non-legacy portion (not shown). The L-STF 206 generally enables a receiving device to perform automatic gain control (AGC) and coarse timing and frequency estimation. The L-LTF 208 generally enables a receiving device to perform fine timing and frequency estimation and also to estimate the wireless channel. The L-SIG 210 generally enables a receiving device to determine a duration of the PDU and use the determined duration to avoid transmitting on top of the PDU. For example, the L-STF 206, the L-LTF 208 and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may generally carry higher layer data, for example, in the form of medium access control (MAC) protocol data units (MPDUs) or aggregated MPDUs (A-MPDUs).

Figure 2B:
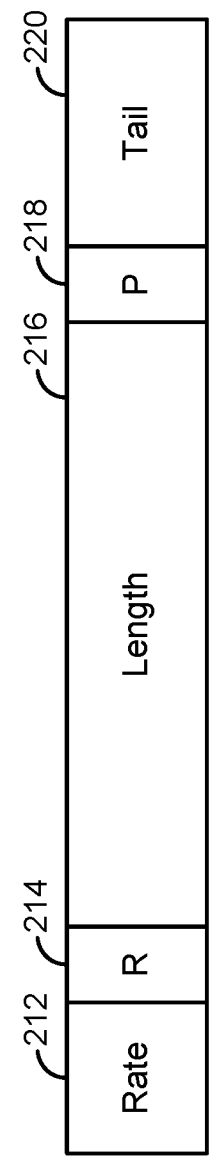
FIG. 2B shows an example field in the PDU of FIG. 2A.

FIG. 2B shows an example L-SIG field 210 in the PDU of FIG. 2A. The L-SIG 210 includes a data rate field 212, a reserved bit 214, a length field 216, a parity bit 218, and tail field 220. The data rate field 212 indicates a data rate (note that the data rate indicated in the data rate field 212 may not be the actual data rate of the data carried in the payload 204). The length field 216 indicates a length of the packet in units of, for example, bytes. The parity bit 218 is used to detect a bit error. The tail field 220 includes tail bits that are used by the receiving device to terminate operation of a decoder (for example, a Viterbi decoder). The receiving device utilizes the data rate and the length indicated in the data rate field 212 and the length field 216 to determine a duration of the packet in units of, for example, microseconds (μs).

Figure 3A:
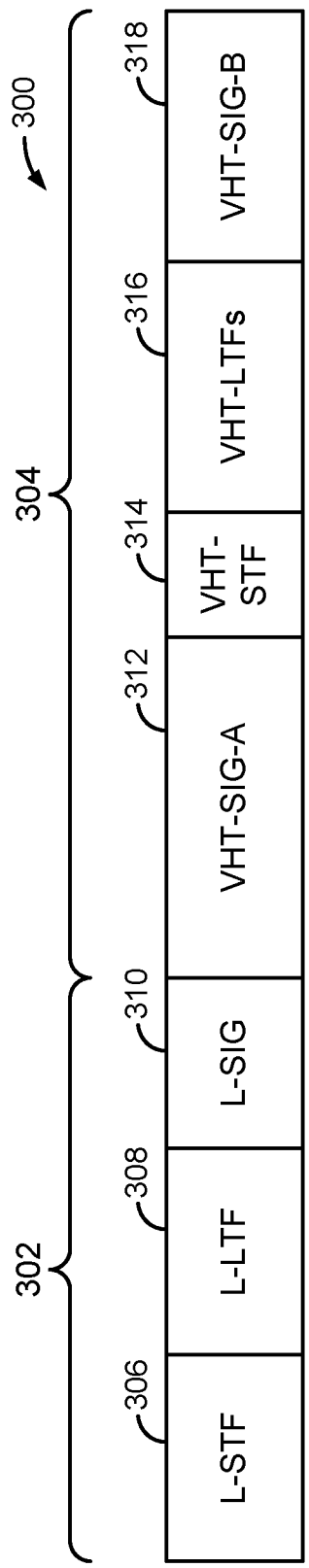
FIG. 3A shows an example physical layer (PHY) preamble usable for communications between an AP and a number of STAs.

FIG. 3A shows an example PHY preamble 300 usable for communications between an AP 102 and each of a number of STAs 104. The preamble 300 includes a legacy portion 302 and a non-legacy portion 304. The legacy portion 302 includes an L-STF 306, an L-LTF 308, and an L-SIG 310. The non-legacy preamble portion 304 is formatted as a Very High Throughput (VHT) preamble in accordance with the IEEE 802.11ac amendment to the IEEE 802.11 standard. The non-legacy preamble portion 304 includes a first VHT signaling field (VHT-SIG-A) 312, a VHT short training field (VHT-STF) 314, one or more VHT long training fields (VHT-LTFs) 316 and a second VHT signaling field (VHT-SIG-B) 318 encoded separately from the VHT-SIG-A field 312. Like the L-STF 306, L-LTF 308, and L-SIG 310, the information in the VHT-SIG-A field 312 may be duplicated and transmitted in each of the component 20 MHz channels in instances involving the use of a bonded channel.

The VHT-STF 214 is used to improve automatic gain control estimation in a MIMO transmission. The VHT-LTFs 216 are used for MIMO channel estimation and pilot sub-carrier tracking. The preamble 200 includes one VHT-LTF 216 for each spatial stream the preamble is transmitted on. The VHT-SIG-A field 212 may indicate to VHT-compatible APs 102 and STAs 104 that the PPDU is a VHT PPDU. The VHT-SIG-A field 212 includes signaling information and other information usable by STAs 104 to decode the VHT-SIG-B field 218. The VHT-SIG-A field 212 may indicate a bandwidth (BW) of the packet, the presence of space-time block coding (STBC), the number $N_{STS}$ of space-time streams per user, a Group ID indicating the group and user position assigned to a STA, a partial association identifier that may combine the AID and the BSSID, a short guard interval (GI) indication, a single-user/multi-user (SU/MU) coding indicating whether convolutional or LDPC coding is used, a modulation and coding scheme (MCS), an indication of whether a beamforming matrix has been applied to the transmission, a cyclic redundancy check (CRC) and a tail.

The VHT-SIG-B field 218 is used for MU transmissions and contains the actual data rate and MPDU or A-MPDU length values for each of the multiple STAs 104, as well as signaling information usable by the STAs 104 to decode data received in the payload portion of the PPDU, including, for example, an MCS and beamforming information.

Figure 3B:
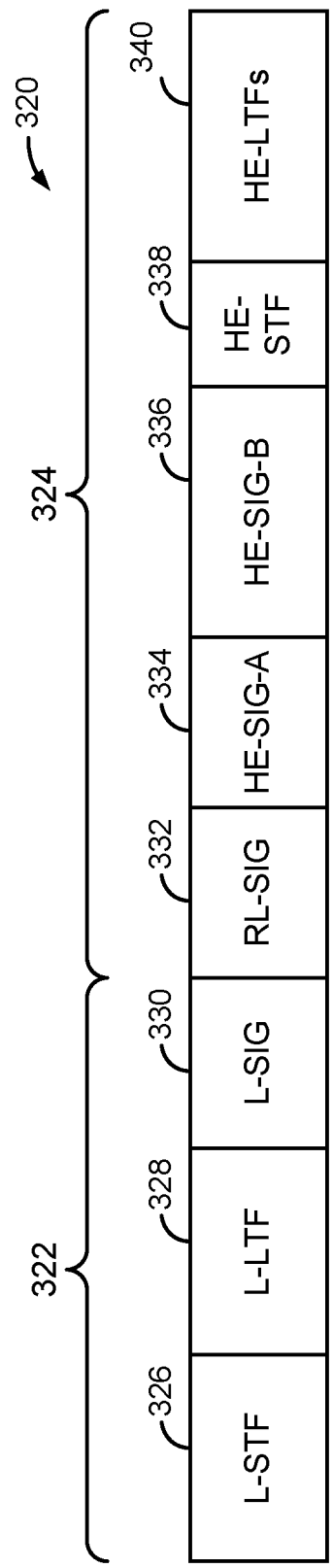
FIG. 3B shows another example PHY preamble usable for communications between an AP and a number of STAs.

FIG. 3B shows another example PHY preamble 320 usable for communications between an AP 102 and each of a number of stations 104. The preamble 320 may be used for MU-OFDMA or MU-MIMO transmissions. The preamble 320 includes a legacy portion 322 and a non-legacy portion 324. The legacy portion 322 includes an L-STF 326, an L-LTF 328, and an L-SIG 330. The non-legacy preamble portion 304 is formatted as a High Efficiency (HE) WLAN preamble in accordance with the IEEE 802.11ax amendment to the IEEE 802.11 standard. The non-legacy preamble portion 324 includes a repeated legacy signaling field (RL-SIG) 332, a first HE signaling field (HE-SIG-A) 334, a second HE signaling field (HE-SIG-B) 336 encoded separately from the HE-SIG-A field 334, an HE short training field (HE-STF) 338 and HE long training fields (HE-LTFs) 340. Like the L-STF 326, L-LTF 328, and L-SIG 330, the information in the RL-SIG field 332 and the HE-SIG-A field 334 may be duplicated and transmitted in each of the component 20 MHz channels in instances involving the use of a bonded channel.

The RL-SIG field 332 may indicate to an HE-compatible STA 104 that the PPDU is an HE PPDU. An AP 102 may use the HE-SIG-A field 334 to indicate to multiple identified STAs 104 that the AP has scheduled UL or DL resources. The HE-SIG-A field 334 may be decoded by each HE-compatible STA 104 served by the AP 102. The HE-SIG-A field 334 includes information usable by the identified STAs 104 to decode associated HE-SIG-B fields 336. For example, the HE-SIG-A field 334 may indicate the frame format, including locations and lengths of HE-SIG-B fields 336, available channel bandwidths, modulation and coding schemes (MCS), among other possibilities. The HE-SIG-A field 334 also may include HE WLAN signaling information usable by STAs 104 other than the number of identified STAs 104.

The HE-SIG-B fields 336 carry STA-specific scheduling information such as, for example, per-user MCS values and per-user RU allocation information. In the context of DL MU-OFDMA, such information enables the respective STAs 104 to identify and decode corresponding RUs in the associated data field. Each HE-SIG-B field 336 includes a common field and at least one STA-specific ("user-specific") field. The common field can indicate RU distributions to multiple STAs 104, indicate the RU assignments in the frequency domain, indicate which RUs are allocated for MU-MIMO transmissions and which RUs correspond to MU-OFDMA transmissions, the number of users in allocations, among other possibilities. The common field may be encoded with common bits, cyclic redundancy check (CRC) bits, and tail bits. The user-specific fields are assigned to particular STAs 104 and used to schedule specific RUs and to indicate the scheduling to other WLAN devices. Each user-specific field may include multiple user block fields (which may be followed by padding). Each user block field may include two user fields that contain information for two STAs to decode their respective RU payloads.

Figure 4:
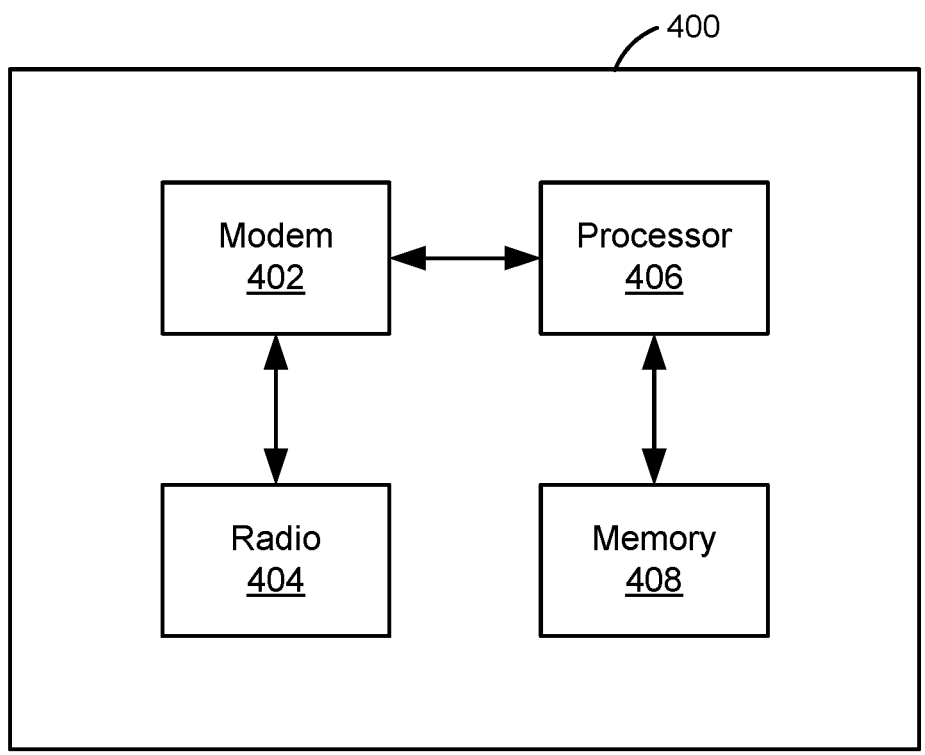
FIG. 4 shows a block diagram of an example wireless communication device.

FIG. 4 shows a block diagram of an example wireless communication device 400. In some implementations, the wireless communication device 400 can be an example of a device for use in a STA such as one of the STAs 104 described above with reference to FIG. 1. In some implementations, the wireless communication device 400 can be an example of a device for use in an AP such as the AP 102 described above with reference to FIG. 1. The wireless communication device 400 is capable of transmitting (or outputting for transmission) and receiving wireless communications (for example, in the form of wireless packets). For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 standard, such as that defined by the IEEE 802.11-2016 specification or amendments thereof including, but not limited to, 802.11ah, 802.11ad, 802.11ay, 802.11ax, 802.11az, 802.11ba and 802.11be.

The wireless communication device 400 can be, or can include, a chip, system on chip (SoC), chipset, package or device that includes one or more modems 402, for example, a Wi-Fi (IEEE 802.11 compliant) modem. In some implementations, the one or more modems 402 (collectively "the modem 402") additionally include a WWAN modem (for example, a 3GPP 4G LTE or 5G compliant modem). In some implementations, the wireless communication device 400 also includes one or more radios 404 (collectively "the radio 404"). In some implementations, the wireless communication device 406 further includes one or more processors, processing blocks or processing elements 406 (collectively "the processor 406") and one or more memory blocks or elements 408 (collectively "the memory 408").

The modem 402 can include an intelligent hardware block or device such as, for example, an application-specific integrated circuit (ASIC) among other possibilities. The modem 402 is generally configured to implement a PHY layer. For example, the modem 402 is configured to modulate packets and to output the modulated packets to the radio 404 for transmission over the wireless medium. The modem 402 is similarly configured to obtain modulated packets received by the radio 404 and to demodulate the packets to provide demodulated packets. In addition to a modulator and a demodulator, the modem 402 may further include digital signal processing (DSP) circuitry, automatic gain control (AGC), a coder, a decoder, a multiplexer and a demultiplexer. For example, while in a transmission mode, data obtained from the processor 406 is provided to a coder, which encodes the data to provide encoded bits. The encoded bits are then mapped to points in a modulation constellation (using a selected MCS) to provide modulated symbols. The modulated symbols may then be mapped to a number $N_{SS}$ of spatial streams or a number $N_{STS}$ of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 404. In implementations involving beamforming, the modulated symbols in the respective spatial streams are precoded via a steering matrix prior to their provision to the IFFT block.

While in a reception mode, digital signals received from the radio 404 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 406) for processing, evaluation or interpretation.

The radio 404 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may in turn be coupled to one or more antennas. For example, in some implementations, the wireless communication device 400 can include, or be coupled with, multiple transmit antennas (each with a corresponding transmit chain) and multiple receive antennas (each with a corresponding receive chain). The symbols output from the modem 402 are provided to the radio 404, which then transmits the symbols via the coupled antennas. Similarly, symbols received via the antennas are obtained by the radio 404, which then provides the symbols to the modem 402.

The processor 406 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 406 processes information received through the radio 404 and the modem 402, and processes information to be output through the modem 402 and the radio 404 for transmission through the wireless medium. For example, the processor 406 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 406 may generally control the modem 402 to cause the modem to perform various operations described above.

The memory 404 can include tangible storage media such as random access memory (RAM) or read-only memory (ROM), or combinations thereof. The memory 404 also can store non-transitory processor- or computer-executable software (SW) code containing instructions that, when executed by the processor 406, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 5B:
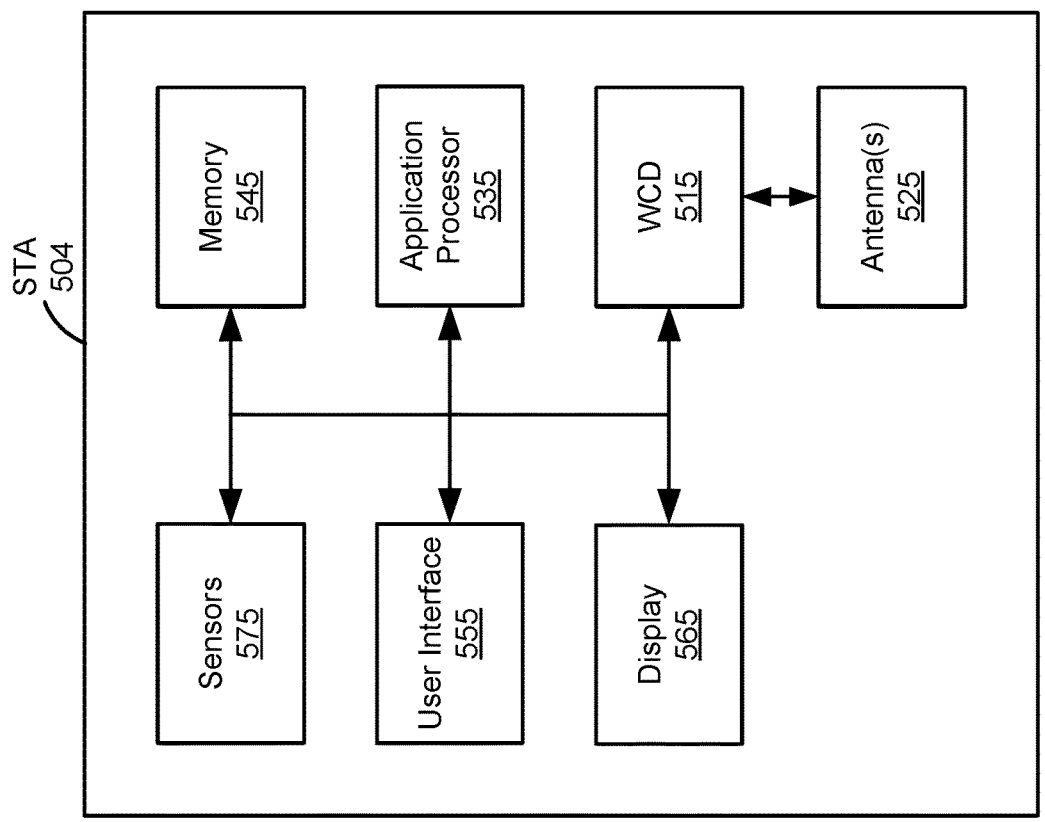
FIG. 5B shows a block diagram of an example station (STA).
Figure 5A:
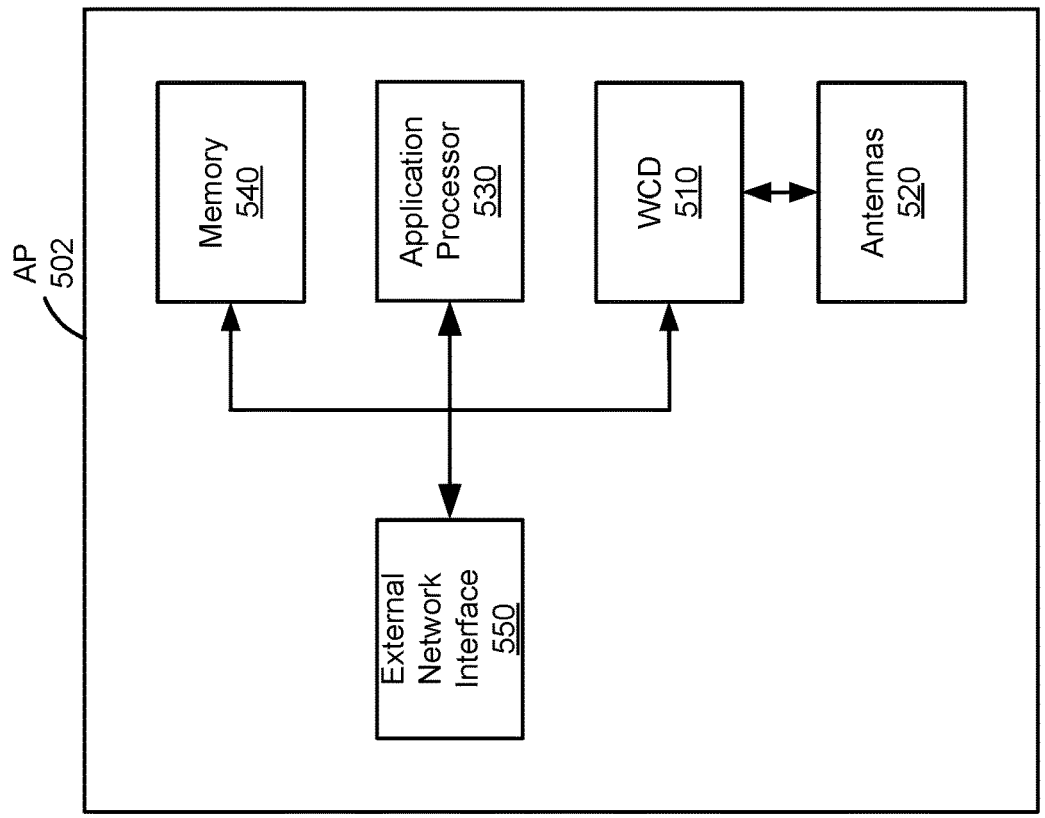
FIG. 5A shows a block diagram of an example access point (AP).

FIG. 5A shows a block diagram of an example AP 502. For example, the AP 502 can be an example implementation of the AP 102 described with reference to FIG. 1. The AP 502 includes a wireless communication device (WCD) 510. For example, the wireless communication device 510 may be an example implementation of the wireless communication device 4000 described with reference to FIG. 4. The AP 502 also includes multiple antennas 520 coupled with the wireless communication device 510 to transmit and receive wireless communications. In some implementations, the AP 502 additionally includes an application processor 530 coupled with the wireless communication device 510, and a memory 540 coupled with the application processor 530. The AP 502 further includes at least one external network interface 550 that enables the AP 502 to communicate with a core network or backhaul network to gain access to external networks including the Internet. For example, the external network interface 550 may include one or both of a wired (for example, Ethernet) network interface and a wireless network interface (such as a WWAN interface). Ones of the aforementioned components can communicate with other ones of the components directly or indirectly, over at least one bus. The AP 502 further includes a housing that encompasses the wireless communication device 510, the application processor 530, the memory 540, and at least portions of the antennas 520 and external network interface 550.

FIG. 5B shows a block diagram of an example STA 504. For example, the STA 504 can be an example implementation of the STA 104 described with reference to FIG. 1. The STA 504 includes a wireless communication device 515. For example, the wireless communication device 515 may be an example implementation of the wireless communication device 400 described with reference to FIG. 4. The STA 504 also includes one or more antennas 525 coupled with the wireless communication device 515 to transmit and receive wireless communications. The STA 504 additionally includes an application processor 535 coupled with the wireless communication device 515, and a memory 545 coupled with the application processor 535. In some implementations, the STA 504 further includes a user interface (UI) 555 (such as a touchscreen or keypad) and a display 565, which may be integrated with the UI 555 to form a touchscreen display. In some implementations, the STA 504 may further include one or more sensors 575 such as, for example, one or more inertial sensors, accelerometers, temperature sensors, pressure sensors, or altitude sensors. Ones of the aforementioned components can communicate with other ones of the components directly or indirectly, over at least one bus. The STA 504 further includes a housing that encompasses the wireless communication device 515, the application processor 535, the memory 545, and at least portions of the antennas 525, UI 555, and display 565.

Some APs and STAs may be configured to transmit and receive wake-up signals, respectively. For example, an AP, such as the AP 102 and 502 described with reference to FIGS. 1 and 5A, respectively, may unicast, multicast or broadcast a wake-up signal to one or more intended recipient devices, such as the STAs 104 and 504 described with reference to FIGS. 1 and 5B, respectively. The AP may transmit a wake-up signal to an intended recipient STA to cause the STA to wake up, turn on, activate or otherwise enable a primary radio of the recipient STA from a sleep, off, low-power or deactivated state in which the primary radio is disabled from transmitting or receiving signals to or from other wireless communication devices. For example, the AP may determine that it has data to send to the STA and subsequently transmit a wake-up signal to cause the STA to activate its primary radio such that it can receive data from the AP. The STA monitors for wake-up signals using a secondary, low-power radio (also referred to as a "wake-up radio"). For example, the secondary radio may have an active power consumption that is less than 1 milliwatt (mW) in some implementations. Using the secondary radio enables the STA to sleep or otherwise be in a low-power state in which its primary radio is deactivated while still monitoring for signals using the secondary radio thereby reducing overall power consumption.

In some implementations, the APs and STAs are configured to transmit and receive wake-up signals in the form of Wake-Up Radio (WUR) packets generated and transmitted according to IEEE 802.11ba. The wake-up signals, in the form of WUR packets, may include WUR Beacon frames enabling an AP to maintain timing synchronization between the it and associated STAs, WUR Wake-up frames enabling an AP to notify a STA that it has buffered data for the STA, WUR Discovery frame enabling low power discovery of WUR-compatible APs, and WUR Vendor Specific frames for supporting vendor specific operations.

Various implementations relate generally to the techniques for identifying wake-up signals. Some implementations more specifically relate to PHY preamble designs for wake-up signals such as WUR packets conforming to IEEE 802.11ba. In some implementations, the preamble designs can include a combination of modulation schemes, data rate indications and length indications enabling devices capable of receiving and decoding wake-up signals to identify the signals as wake-up signals (for example, WUR packets), while ensuring that devices not capable of receiving and decoding wake-up signals identify the wake-up signals as legacy packets, or otherwise not WUR packets.

FIG. 6A shows an example PDU 600 for transmitting a wake-up radio frame according to some implementations. The PDU 600 includes a physical layer preamble that includes a first portion 602 followed by a second portion 604. The first portion 602 includes one or more symbols and the second portion 604 includes two or more symbols. Each of the symbols in the first portion 602 is modulated according to a binary phase shift keying (BPSK) modulation scheme. In some implementations, the first two symbols in the second portion 604 immediately following the last symbol in the first portion 602 also are modulated according to a BPSK modulation scheme. In some other implementations, one or both of the first two symbols in the second portion 604 is modulated according to a quadrature BPSK (Q-BPSK) modulation scheme. The PDU 600 further includes a physical layer payload 606 following the preamble (for example, immediately following the second portion 604 of the preamble). In some implementations, the payload 606 includes multiple symbols modulated according to a multicarrier (MC) on-off keying (OOK) (MC-OOK) modulation scheme. For example, in some implementations the payload 606 is generated according to the IEEE 802.11ba communication protocol and includes a WUR Beacon frame, a WUR Wake-up frame, a WUR Discovery frame or a WUR Vendor Specific frame.

In the implementation shown in FIG. 6A, the first portion 602 of the PDU 600 is a legacy portion that includes a legacy short training field (L-STF) 608, followed by a legacy long training field (L-LTF) 610, which is followed by a legacy signaling field (L-SIG) 612. For example, in some implementations, the first portion 602 is generated according to the IEEE 802.11a communication protocol and the L-STF 608 has a length of two symbols, the L-LTF 610 has a length of two symbols, and the L-SIG 612 has a length of one symbol.

In the implementation shown in FIG. 6A, the second portion 604 includes only two symbols, a first symbol (Mark1) 614 and a second symbol (Mark2) 616 (in other implementations, the second portion 604 may include additional symbols). In some implementations, the second symbol 616 in the second portion 604 is identical to the first symbol 614 in the second portion 604. In some other implementations, tones in the second symbol 616 carry different information than corresponding tones in the first symbol 614.

In some implementations, the second portion 604 includes a repeat of one of the symbols in the first portion 602. For example, the first symbol 614 in the second portion 604 can be a repeated L-SIG field (RL-SIG) that immediately follows the L-SIG 612 in the first portion 602. Alternatively, the first symbol 614 in the second portion 604 can be modulated using a different waveform than the waveform used to modulate the last symbol in the first portion 602. For example, the last symbol in the first portion 602 can include a first set of code bits, and the first symbol 614 in the second portion 604 can include a second set of code bits that are the logical complement of the first set of code bits.

In some implementations, the first portion 602 includes one or more symbols defining a data rate field and one or more symbols defining a length field (note that the data rate indicated in the data rate field may not be the actual data rate of the data carried in the payload 606). For example, the L-SIG 612 can be an example of the L-SIG 210 described with reference to FIGS. 2A and 2B. As shown in FIG. 2B, the L-SIG 612 can include a data rate field 212 and a length field 216. In some implementations of the PDU 600, the data rate field in the first portion 602 indicates a data rate of 6 Megabits per second (Mbps), and the length field indicates a modulus 3 (or "mod 3") of 0. In some other implementations, the data rate field in the first portion 602 indicates a data rate of 6 Megabits per second (Mbps), and the length field indicates a modulus 3 of 1 or 2. In some such latter implementations in which the modulus 3 is 1 or 2, the first symbol 614 in the second portion 604 is modulated using a different waveform than the waveform used to modulate the last symbol in the first portion 602. As described above, the last symbol in the first portion 602 can be modulated to include a first set of code bits, and the first symbol 614 in the second portion 604 can be modulated to include a second set of code bits that are the logical complement of the first set of code bits. In yet other implementations, the data rate field in the first portion 602 indicates a data rate of 9 Mbps. In such 9 Mbps implementations, the length field can indicate a modulus of 0, 1 or 2.

FIG. 6B shows another example PDU 620 for transmitting a wake-up radio frame according to some implementations. The PDU 620 includes a physical layer preamble that includes a first portion 622 followed by a second portion 624. The first portion 622 includes multiple symbols and the second portion 624 includes only one symbol. Each of the symbols in the first portion 622 is modulated according to a BPSK modulation scheme. The one symbol (Mark1) 634 in the second portion 604 immediately following the last symbol in the first portion 622 also may be modulated according to a BPSK modulation scheme. The PDU 620 further includes a physical layer payload 626 following the preamble (for example, immediately following the second portion 624 of the preamble). In some implementations, the payload 626 includes multiple symbols modulated according to an MC-OOK modulation scheme. For example, in some implementations the payload 626 is generated according to the IEEE 802.11ba communication protocol and includes a WUR Beacon frame, a WUR Wake-up frame, a WUR Discovery frame or a WUR Vendor Specific frame.

In the implementation shown in FIG. 6B, the first portion 622 of the PDU 620 is a legacy portion that includes an L-STF 628, followed by an L-LTF 630, which is followed by an L-SIG 632. For example, in some implementations, the first portion 622 is generated according to the IEEE 802.11a communication protocol and the L-STF 628 has a length of two symbols, the L-LTF 630 has a length of two symbols, and the L-SIG 632 has a length of one symbol.

In some implementations, the first portion 622 includes one or more symbols defining a data rate field and one or more symbols defining a length field (note that the data rate indicated in the data rate field may not be the actual data rate of the data carried in the payload 626). For example, the L-SIG 622 can be an example of the L-SIG 210 described with reference to FIGS. 2A and 2B. As shown in FIG. 2B, the L-SIG 622 can include a data rate field 212 and a length field 216. In some implementations of the PDU 620, the data rate field in the first portion 622 indicates a data rate of 6 Mbps, and the length field indicates a modulus 3 of 1 or 2. In some such implementations in which the modulus 3 is 1 or 2, the first symbol 624 in the second portion 624 is modulated using a different waveform than the waveform used to modulate the last symbol in the first portion 622. For example, the last symbol in the first portion 622 can include a first set of code bits, and the first symbol 624 in the second portion 624 can include a second set of code bits that are the logical complement of the first set of code bits.

FIG. 6C shows another example PDU 640 for transmitting a wake-up radio frame according to some implementations. The PDU 640 includes a physical layer preamble 642 that includes multiple symbols. Each of the symbols in the preamble 642 is modulated according to a BPSK modulation scheme. The PDU 640 further includes a physical layer payload 646 following the preamble 642 (for example, immediately following the preamble). In some implementations, the payload 646 includes multiple symbols modulated according to an MC-OOK modulation scheme. For example, in some implementations the payload 646 is generated according to the IEEE 802.11ba communication protocol and includes a WUR Beacon frame, a WUR Wake-up frame, a WUR Discovery frame or a WUR Vendor Specific frame.

In the implementation shown in FIG. 6C, the preamble 642 of the PDU 640 consists of a legacy portion that includes an L-STF 648, followed by an L-LTF 650, which is followed by an L-SIG 652. For example, in some implementations, the preamble 642 is generated according to the IEEE 802.11a communication protocol and the L-STF 648 has a length of two symbols, the L-LTF 650 has a length of two symbols, and the L-SIG 652 has a length of one symbol.

In some implementations, the preamble 642 includes one or more symbols defining a data rate field and one or more symbols defining a length field (note that the data rate indicated in the data rate field may not be the actual data rate of the data carried in the payload 646). For example, the L-SIG 652 can be an example of the L-SIG 210 described with reference to FIGS. 2A and 2B. As shown in FIG. 2B, the L-SIG 652 can include a data rate field 212 and a length field 216. In some implementations of the PDU 640, the data rate field in the preamble 642 indicates a data rate of 9 Mbps. In some implementations, the length field can indicate a modulus 3 of 0, 1 or 2.

Figure 7:
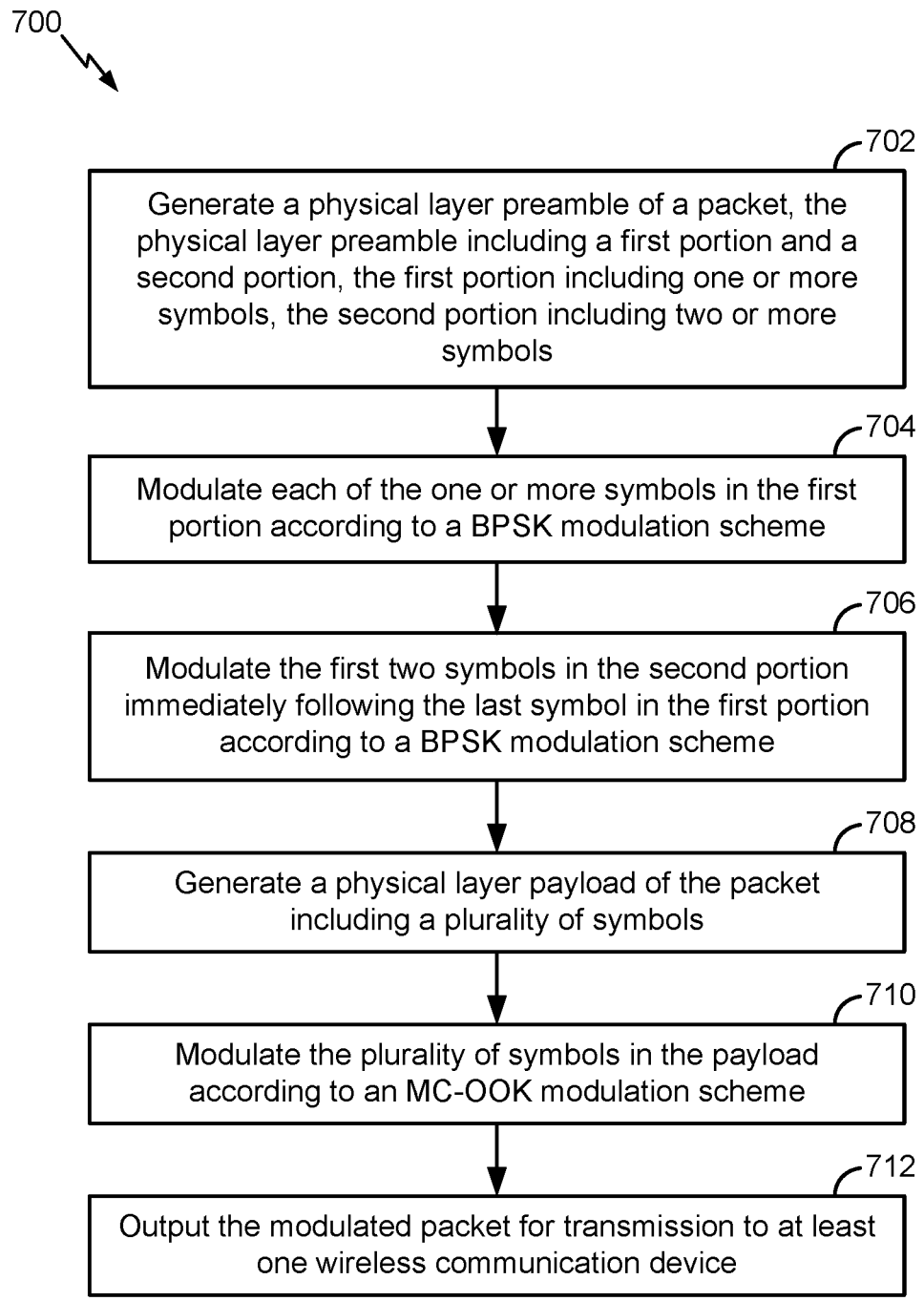
FIG. 7 shows a flowchart illustrating an example process for wireless communication according to some implementations.

FIG. 7 shows a flowchart illustrating an example process 700 for wireless communication according to some implementations. In some implementations, the process 700 may be used to transmit a wake-up signal to a sleeping device to wake up or otherwise activate a primary radio of the sleeping device to enable bi-directional communications with the sleeping device. For example, the process 700 may be performed by a wireless communication device configured to generate and transmit wake-up signals such as, for example, Wake-Up Radio (WUR) packets generated and transmitted according to IEEE 802.11ba. The process 700 can be performed by a wireless communication device such as the wireless communication device 400 described above with reference to FIG. 4. In some such implementations, the process 700 may be performed by a wireless communication device operating within an AP, such as one of the APs 102 and 502 described above with reference to FIGS. 1 and 5A, respectively.

In some implementations, the process 700 begins in block 702 with generating a physical layer preamble of a packet including a first portion and a second portion. The first portion includes one or more symbols and the second portion includes two or more symbols. For example, the packet can be an example of the PDU 600, and the first and the second portions of the preamble can be examples of the first and the second portions 602 and 604, respectively, described with reference to FIG. 6A. The process 700 proceeds in block 704 with modulating each of the one or more symbols in the first portion according to a BPSK modulation scheme, and in block 706, with modulating the first two symbols in the second portion immediately following the last symbol in the first portion according to a BPSK modulation scheme. In block 708, the process proceeds with generating a physical layer payload of the packet including a plurality of symbols, and in block 710, with modulating the plurality of symbols in the payload according to an MC-OOK modulation scheme. In some implementations, the modulated packet is then output for transmission to at least one second wireless communication device in block 712.

In some implementations, the first portion of the preamble is a legacy portion that includes an L-STF, followed by an L-LTF, which is followed by an L-SIG. For example, in some implementations, the first portion is generated according to the IEEE 802.11a communication protocol. In some implementations, the payload is generated according to the IEEE 802.11ba communication protocol and includes a WUR Beacon frame, a WUR Wake-up frame, a WUR Discovery frame or a WUR Vendor Specific frame.

In some implementations, the second portion of the preamble may include only two symbols, such as the Mark1 and Mark2 symbols 614 and 616 of the PDU 600. In some implementations, the second symbol in the second portion is identical to the first symbol in the second portion. In some other implementations, tones in the second symbol carry different information than corresponding tones in the first symbol.

In some implementations, the second portion of the preamble includes a repeat of one of the symbols in the first portion. For example, the first symbol in the second portion can be an RL-SIG that immediately follows the L-SIG in the first portion. Alternatively, the first symbol in the second portion can be modulated in block 706 using a different waveform than the waveform used to modulate the last symbol in the first portion. For example, the wireless communication device may modulate the last symbol in the first portion of the preamble in block 704 to include a first set of code bits, and modulate the first symbol in the second portion of the preamble in 706 to include a second set of code bits that are the logical complement of the first set of code bits.

In some implementations, the first portion of the preamble is generated in block 702 to include one or more symbols defining a data rate field and one or more symbols defining a length field (note that the data rate indicated in the data rate field may not be the actual data rate of the data carried in the payload). In some implementations, the data rate field in the first portion of the preamble is generated to indicate a data rate of 6 Mbps, and the length field is generated to indicate a modulus 3 of 0. In some other implementations, the data rate field in the first portion of the preamble indicates a data rate of 6 Mbps, and the length field indicates a modulus 3 of 1 or 2. In some such latter implementations in which the modulus 3 is 1 or 2, the first symbol in the second portion of the preamble is modulated in block 706 using a different waveform than the waveform used to modulate the last symbol in the first portion. As described above, the wireless communication device may modulate the last symbol in the first portion of the preamble in block 704 to include a first set of code bits, and modulate the first symbol in the second portion of the preamble in 706 to include a second set of code bits that are the logical complement of the first set of code bits. In yet other implementations, the data rate field in the first portion may indicate a data rate of 9 Mbps. In such 9 Mbps implementations, the length field may indicate a modulus 3 of 0, 1 or 2.

Figure 8:
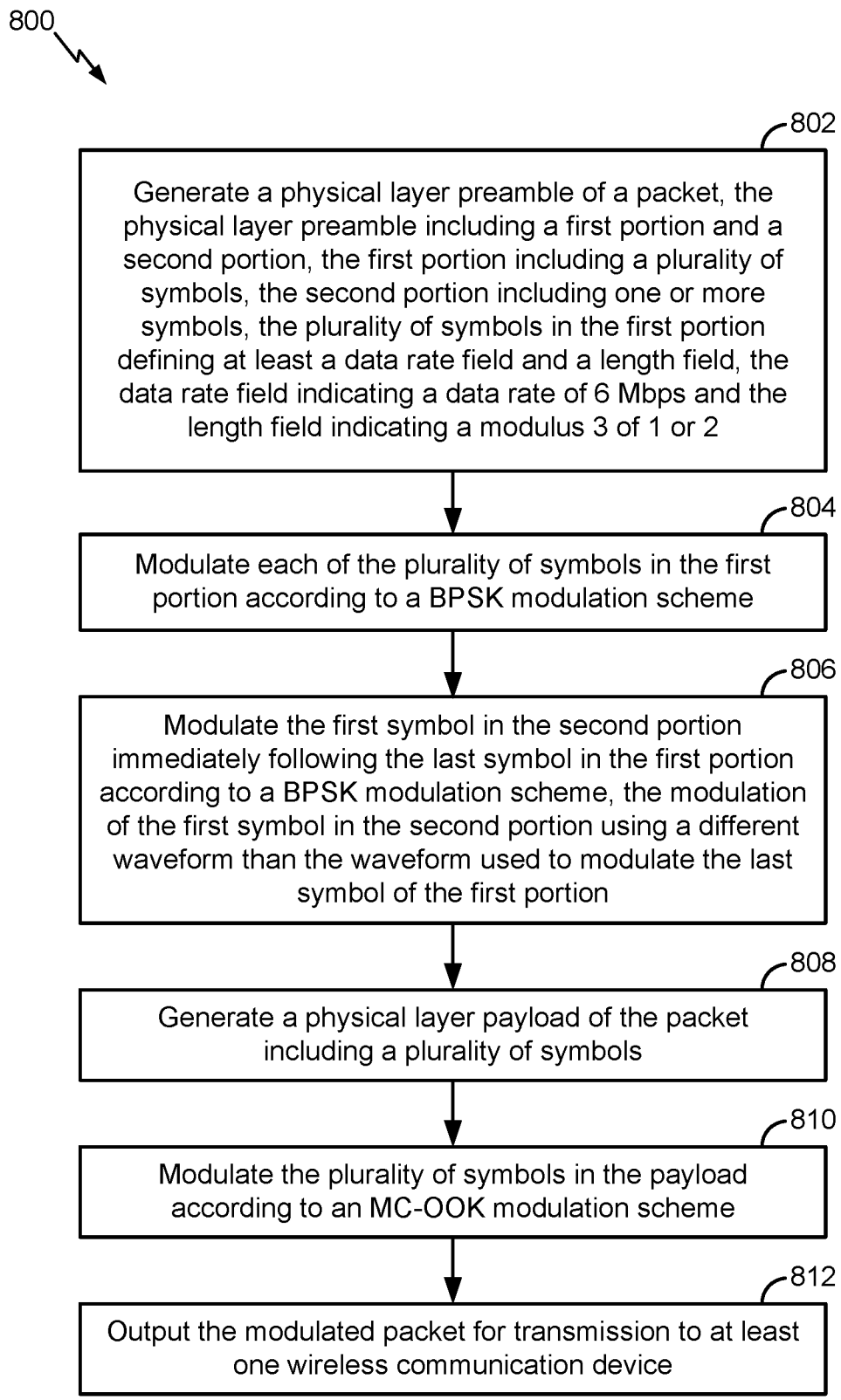
FIG. 8 shows a flowchart illustrating an example process for wireless communication according to some implementations.

FIG. 8 shows a flowchart illustrating an example process 800 for wireless communication according to some implementations. In some implementations, the process 800 may be used to transmit a wake-up signal to a sleeping device to wake up or otherwise activate a primary radio of the sleeping device to enable bi-directional communications with the sleeping device. For example, the process 800 may be performed by a wireless communication device configured to generate and transmit wake-up signals such as, for example, WUR packets generated and transmitted according to IEEE 802.11ba. The process 800 can be performed by a wireless communication device such as the wireless communication device 400 described above with reference to FIG. 4. In some such implementations, the process 800 may be performed by a wireless communication device operating within an AP, such as one of the APs 102 and 502 described above with reference to FIGS. 1 and 5A, respectively.

In some implementations, the process 800 begins in block 802 with generating a physical layer preamble of a packet including a first portion and a second portion. The first portion includes a plurality of symbols and the second portion includes one or more symbols. For example, the packet can be an example of the PDU 600, and the first and the second portions of the preamble can be examples of the first and the second portions 602 and 604, respectively, described with reference to FIG. 6A. As another example, the packet can be an example of the PDU 620, and the first and the second portions of the preamble can be examples of the first and the second portions 622 and 624, respectively, described with reference to FIG. 6B. The first portion of the preamble is generated in block 802 to include one or more symbols defining a data rate field and one or more symbols defining a length field. In some implementations, the data rate field in the first portion of the preamble is generated to indicate a data rate of 6 Mbps, and the length field is generated to indicate a modulus 3 of 1 or 2 (note that the data rate indicated in the data rate field may not be the actual data rate of the data carried in the payload).

The process 800 proceeds in block 804 with modulating each of the plurality of symbols in the first portion according to a BPSK modulation scheme, and in block 806, with modulating the first symbol in the second portion immediately following the last symbol in the first portion according to a BPSK modulation scheme. In some implementations in which the modulus 3 is 1 or 2, the first symbol in the second portion of the preamble is modulated in block 806 using a different waveform than the waveform used to modulate the last symbol in the first portion. As described above, the wireless communication device may modulate the last symbol in the first portion of the preamble in block 804 to include a first set of code bits, and modulate the first symbol in the second portion of the preamble in 806 to include a second set of code bits that are the logical complement of the first set of code bits.

In block 808, the process proceeds with generating a physical layer payload of the packet including a plurality of symbols, and in block 810, with modulating the plurality of symbols in the payload according to an MC-OOK modulation scheme. In some implementations, the modulated packet is then output for transmission to at least one second wireless communication device in block 812.

In some implementations, the first portion of the preamble is a legacy portion that includes an L-STF, followed by an L-LTF, which is followed by an L-SIG. For example, in some implementations, the first portion is generated according to the IEEE 802.11a communication protocol. In some implementations, the payload is generated according to the IEEE 802.11ba communication protocol and includes a WUR Beacon frame, a WUR Wake-up frame, a WUR Discovery frame or a WUR Vendor Specific frame.

Figure 9:
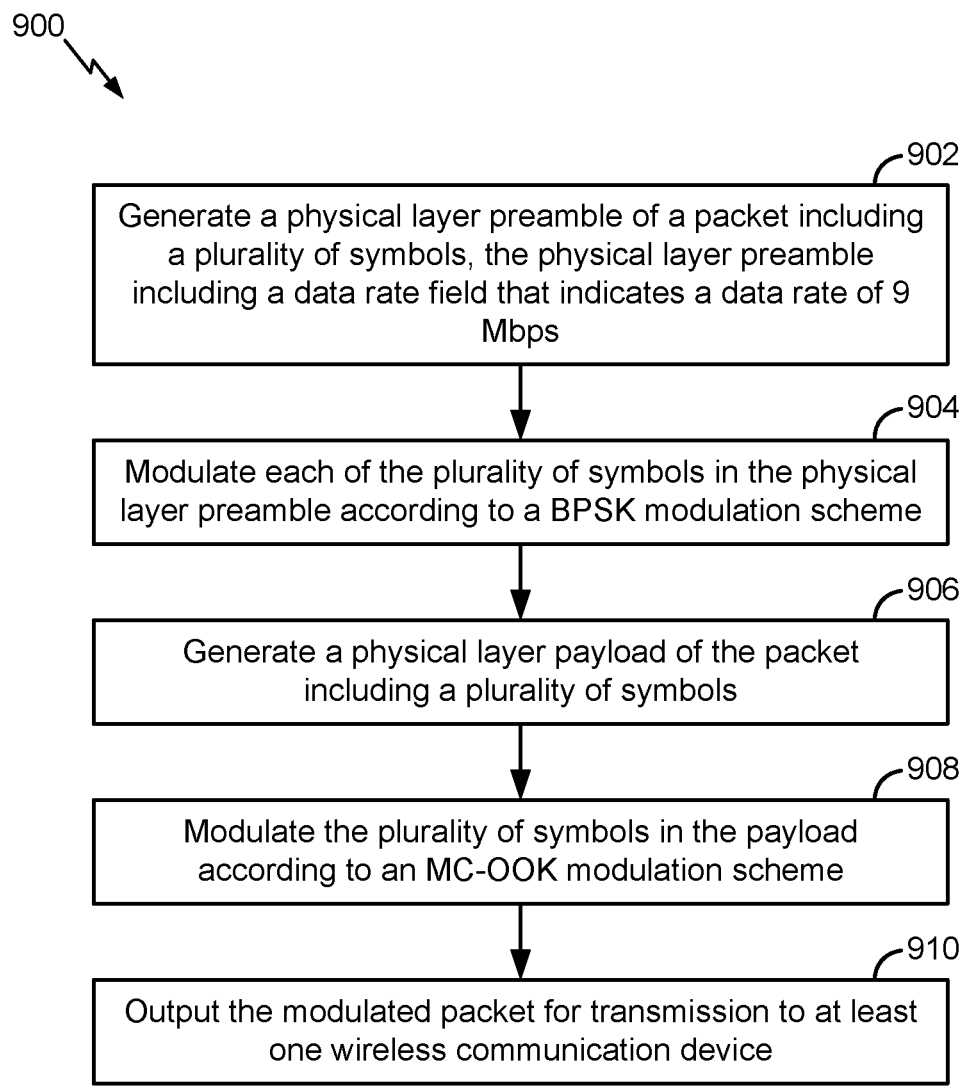
FIG. 9 shows a flowchart illustrating an example process for wireless communication according to some implementations.

FIG. 9 shows a flowchart illustrating an example process 900 for wireless communication according to some implementations. In some implementations, the process 900 may be used to transmit a wake-up signal to a sleeping device to wake up or otherwise activate a primary radio of the sleeping device to enable bi-directional communications with the sleeping device. For example, the process 900 may be performed by a wireless communication device configured to generate and transmit wake-up signals such as, for example, WUR packets generated and transmitted according to IEEE 802.11ba. The process 900 can be performed by a wireless communication device such as the wireless communication device 400 described above with reference to FIG. 4. In some such implementations, the process 900 may be performed by a wireless communication device operating within an AP, such as one of the APs 102 and 502 described above with reference to FIGS. 1 and 5A, respectively.

In some implementations, the process 900 begins in block 902 with generating a physical layer preamble of a packet including a plurality of symbols. For example, the packet can be an example of the PDU 600, the PDU 620, or the PDU40 described with reference to FIGS. 6A, 6B and 6C, respectively. The preamble is generated in block 902 to include one or more symbols defining a data rate field. In some implementations, the data rate field in the preamble is generated to indicate a data rate of 9 Mbps (note that the data rate indicated in the data rate field may not be the actual data rate of the data carried in the payload). The process 900 proceeds in block 904 with modulating each of the plurality of symbols in the preamble according to a BPSK modulation scheme. In block 906, the process proceeds with generating a physical layer payload of the packet including a plurality of symbols, and in block 908, with modulating the plurality of symbols in the payload according to an MC-OOK modulation scheme. In some implementations, the modulated packet is then output for transmission to at least one second wireless communication device in block 910.

In some implementations, the preamble is a legacy preamble that includes only an L-STF, followed by an L-LTF, which is followed by an L-SIG. For example, in some implementations, the preamble is generated according to the IEEE 802.11a communication protocol. In some implementations, the payload is generated according to the IEEE 802.11ba communication protocol and includes a WUR Beacon frame, a WUR Wake-up frame, a WUR Discovery frame or a WUR Vendor Specific frame. In some implementations, the payload immediately follows the L-SIG. In some other implementations, the preamble is generated in 902 to include both a first portion and a second portion. For example, the first portion can be a legacy portion consisting of the L-STF, L-LTF and L-SIG. The second portion can include one or more symbols.

In some implementations, the wireless communication device modulates the first symbol in the second portion in block 904 according to a BPSK modulation scheme. In some such implementations, the first symbol in the second portion is identical to the last symbol in the first portion. For example, the first symbol in the second portion can be an RL-SIG that immediately follows the L-SIG in the first portion. Alternatively, the first symbol in the second portion can be modulated in block 904 using a different waveform than the waveform used to modulate the last symbol in the first portion. As described above, the wireless communication device may modulate the last symbol in the first portion of the preamble in block 904 to include a first set of code bits, and modulate the first symbol in the second portion of the preamble in 904 to include a second set of code bits that are the logical complement of the first set of code bits. In some other implementations, the wireless communication device modulates the first symbol in the second portion in block 904 according to a Q-BPSK modulation scheme. In some such latter implementations, the second portion may further include a second symbol modulated according to a Q-BPSK modulation scheme.

In some implementations, the first portion of the preamble is generated in block 902 to further include one or more symbols defining a length field. In some implementations, the length field is generated to indicate a modulus 3 of 0, 1 or 2.

Figure 10:
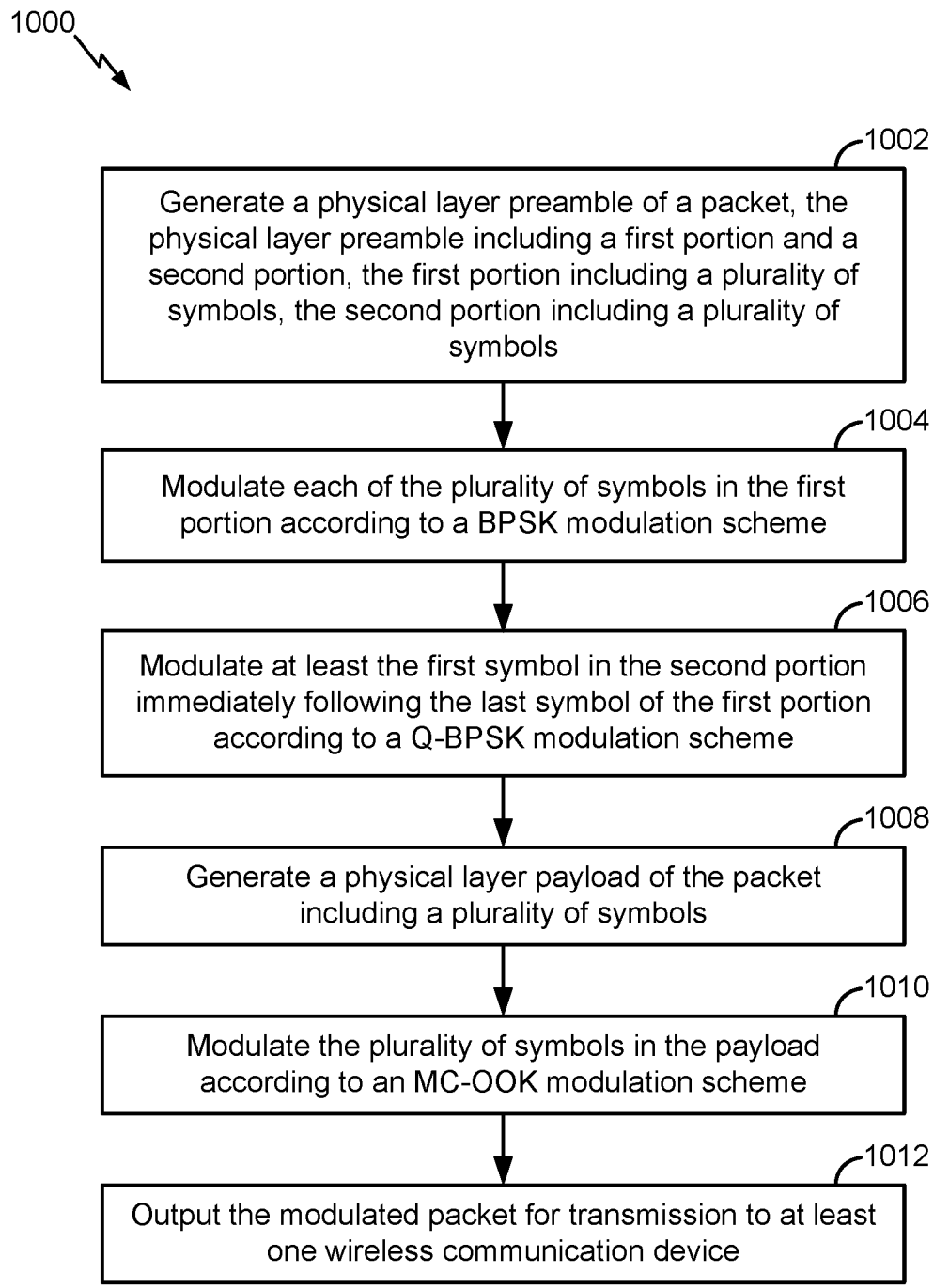
FIG. 10 shows a flowchart illustrating an example process for wireless communication according to some implementations.

FIG. 10 shows a flowchart illustrating an example process 1000 for wireless communication according to some implementations. In some implementations, the process 1000 may be used to transmit a wake-up signal to a sleeping device to wake up or otherwise activate a primary radio of the sleeping device to enable bi-directional communications with the sleeping device. For example, the process 1000 may be performed by a wireless communication device configured to generate and transmit wake-up signals such as, for example, WUR packets generated and transmitted according to IEEE 802.11ba. The process 1000 can be performed by a wireless communication device such as the wireless communication device 400 described above with reference to FIG. 4. In some such implementations, the process 1000 may be performed by a wireless communication device operating within an AP, such as one of the APs 102 and 502 described above with reference to FIGS. 1 and 5A, respectively.

In some implementations, the process 1000 begins in block 1002 with generating a physical layer preamble of a packet including a first portion and a second portion. The first portion includes a plurality of symbols and the second portion includes one or more symbols. For example, the packet can be an example of the PDU 600, and the first and the second portions of the preamble can be examples of the first and the second portions 602 and 604, respectively, described with reference to FIG. 6A. As another example, the packet can be an example of the PDU 620, and the first and the second portions of the preamble can be examples of the first and the second portions 622 and 624, respectively, described with reference to FIG. 6B.

The process 1000 proceeds in block 1004 with modulating each of the plurality of symbols in the first portion according to a BPSK modulation scheme, and in block 1006, with modulating at least the first symbol in the second portion immediately following the last symbol in the first portion according to a Q-BPSK modulation scheme. In block 1008, the process proceeds with generating a physical layer payload of the packet including a plurality of symbols, and in block 1010, with modulating the plurality of symbols in the payload according to an MC-OOK modulation scheme. In some implementations, the modulated packet is then output for transmission to at least one second wireless communication device in block 1012.

In some implementations, the first portion of the preamble is a legacy portion that includes an L-STF, followed by an L-LTF, which is followed by an L-SIG. For example, in some implementations, the first portion is generated according to the IEEE 802.11a communication protocol. In some implementations, the payload is generated according to the IEEE 802.11ba communication protocol and includes a WUR Beacon frame, a WUR Wake-up frame, a WUR Discovery frame or a WUR Vendor Specific frame.

In some implementations, the second portion of the preamble may include only two symbols, such as the Mark1 and Mark2 symbols 614 and 616 of the PDU 600. In some implementations, the first two symbols in the second portion are both modulated according to a Q-BPSK modulation scheme. For example, the wireless communication device may generate and modulate the second portion in blocks 1002 and 1006 in the form of a High Throughput (HT) signaling field (HT-SIG) according to the IEEE 802.11n communication protocol (now incorporated in IEEE 802.11-2016). In some implementations, the second symbol in the second portion is identical to the first symbol in the second portion. In some other implementations, tones in the second symbol carry different information than corresponding tones in the first symbol.

In some implementations, the first portion of the preamble is generated in block 1002 to include one or more symbols defining a data rate field and one or more symbols defining a length field (note that the data rate indicated in the data rate field may not be the actual data rate of the data carried in the payload). In some implementations, the data rate field in the first portion of the preamble is generated to indicate a data rate of 6 Mbps, and the length field is generated to indicate a modulus 3 of 0, 1 or 2.

Figure 11:
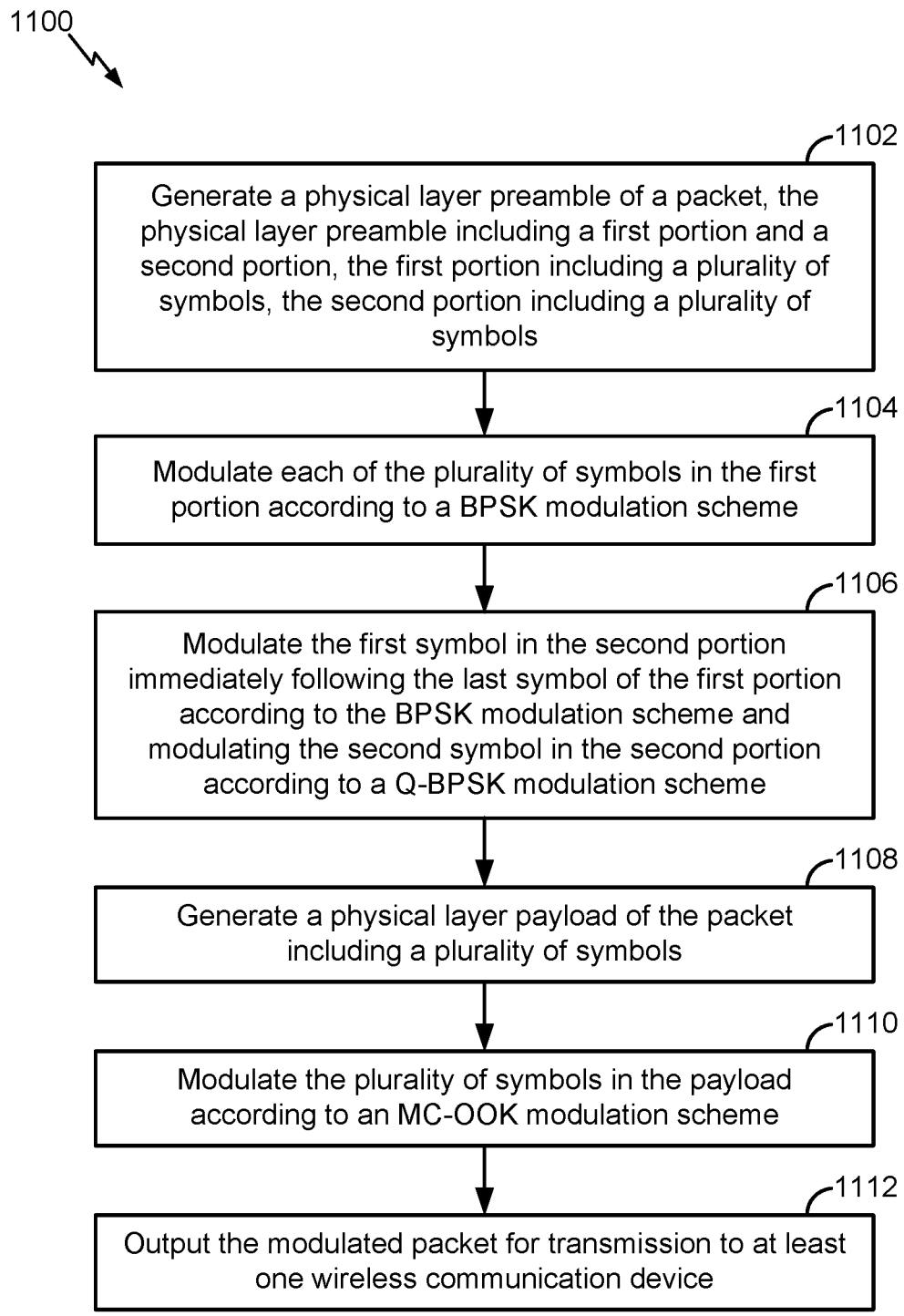
FIG. 11 shows a flowchart illustrating an example process for wireless communication according to some implementations.

FIG. 11 shows a flowchart illustrating an example process 1100 for wireless communication according to some implementations. In some implementations, the process 1100 may be used to transmit a wake-up signal to a sleeping device to wake up or otherwise activate a primary radio of the sleeping device to enable bi-directional communications with the sleeping device. For example, the process 1100 may be performed by a wireless communication device configured to generate and transmit wake-up signals such as, for example, WUR packets generated and transmitted according to IEEE 802.11ba. The process 1100 can be performed by a wireless communication device such as the wireless communication device 400 described above with reference to FIG. 4. In some such implementations, the process 1100 may be performed by a wireless communication device operating within an AP, such as one of the APs 102 and 502 described above with reference to FIGS. 1 and 5A, respectively.

In some implementations, the process 1100 begins in block 1102 with generating a physical layer preamble of a packet including a first portion and a second portion. The first portion includes a plurality of symbols and the second portion includes a plurality of symbols. For example, the packet can be an example of the PDU 600, and the first and the second portions of the preamble can be examples of the first and the second portions 602 and 604, respectively, described with reference to FIG. 6A. The process 1100 proceeds in block 1104 with modulating each of the plurality of symbols in the first portion according to a BPSK modulation scheme, and in block 1106, with modulating the first symbol in the second portion immediately following the last symbol in the first portion according to a BPSK modulation scheme and modulating the second symbol in the second portion according to a Q-BPSK modulation scheme. In block 1108, the process proceeds with generating a physical layer payload of the packet including a plurality of symbols, and in block 1110, with modulating the plurality of symbols in the payload according to an MC-OOK modulation scheme. In some implementations, the modulated packet is then output for transmission to at least one second wireless communication device in block 1112.

In some implementations, the first portion of the preamble is a legacy portion that includes an L-STF, followed by an L-LTF, which is followed by an L-SIG. For example, in some implementations, the first portion is generated according to the IEEE 802.11a communication protocol. In some implementations, the payload is generated according to the IEEE 802.11ba communication protocol and includes a WUR Beacon frame, a WUR Wake-up frame, a WUR Discovery frame or a WUR Vendor Specific frame.

In some implementations, the second portion of the preamble may include only two symbols, such as the Mark1 and Mark2 symbols 614 and 616 of the PDU 600. For example, the wireless communication device may generate and modulate the second portion in blocks 1102 and 1106 in the form of a two-symbol Very High Throughput (VHT) signaling field (VHT-SIG-A) according to the IEEE 802.11ac communication protocol (now incorporated in IEEE 802.11-2016) as, for example, shown in FIG. 3A.

In some implementations, the first portion of the preamble is generated in block 1102 to include one or more symbols defining a data rate field and one or more symbols defining a length field (note that the data rate indicated in the data rate field may not be the actual data rate of the data carried in the payload). In some implementations, the data rate field in the first portion of the preamble is generated to indicate a data rate of 6 Mbps, and the length field is generated to indicate a modulus 3 of 0.

Figure 12:
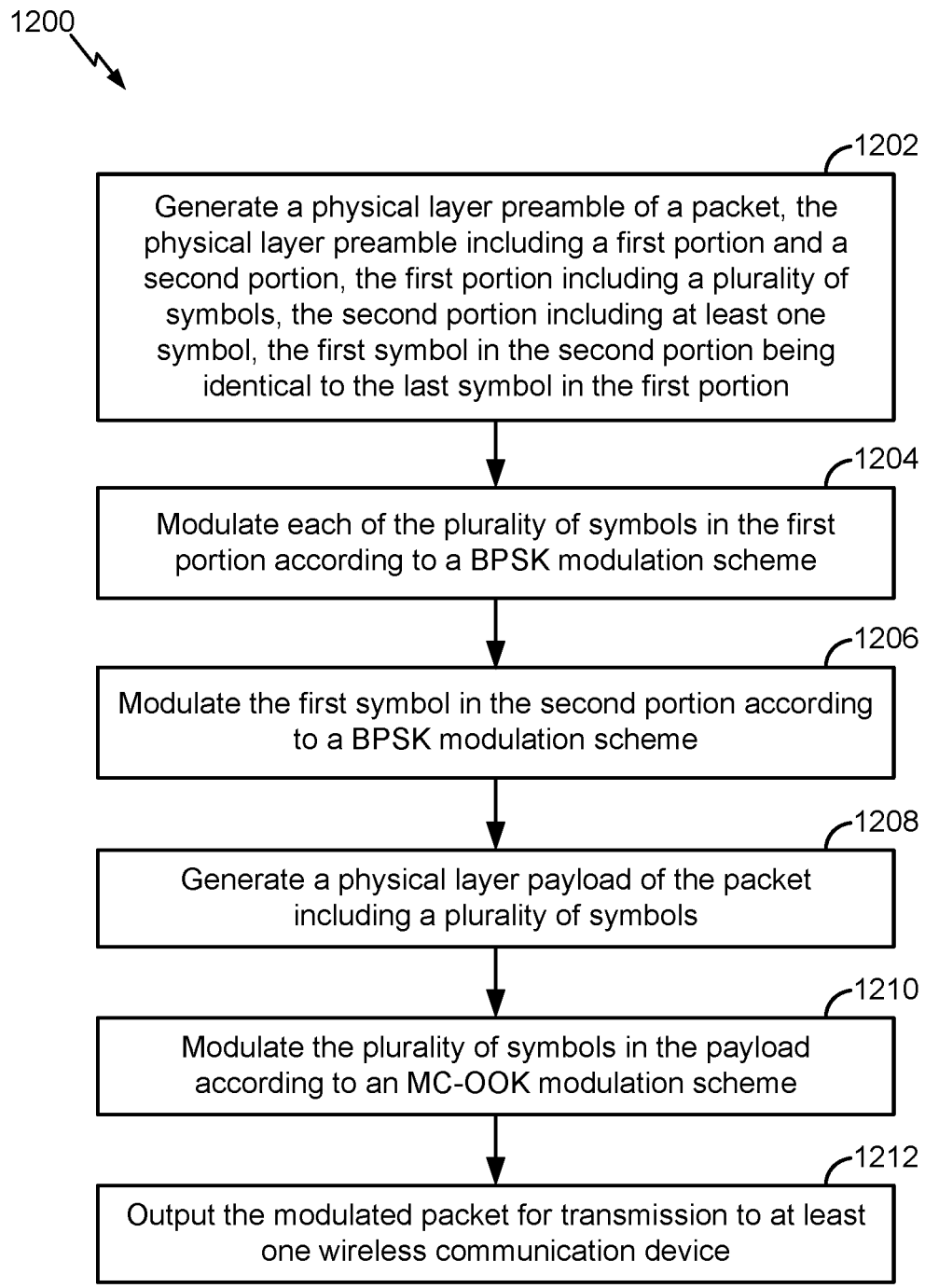
FIG. 12 shows a flowchart illustrating an example process for wireless communication according to some implementations.

FIG. 12 shows a flowchart illustrating an example process 1200 for wireless communication according to some implementations. In some implementations, the process 1200 may be used to transmit a wake-up signal to a sleeping device to wake up or otherwise activate a primary radio of the sleeping device to enable bi-directional communications with the sleeping device. For example, the process 1200 may be performed by a wireless communication device configured to generate and transmit wake-up signals such as, for example, WUR packets generated and transmitted according to IEEE 802.11ba. The process 1200 can be performed by a wireless communication device such as the wireless communication device 400 described above with reference to FIG. 4. In some such implementations, the process 1200 may be performed by a wireless communication device operating within an AP, such as one of the APs 102 and 502 described above with reference to FIGS. 1 and 5A, respectively.

In some implementations, the process 1200 begins in block 1202 with generating a physical layer preamble of a packet including a first portion and a second portion. The first portion includes a plurality of symbols and the second portion includes one or more symbols. The first symbol (which may be the only symbol) in the second portion is identical to the last symbol in the first portion. For example, the packet can be an example of the PDU 620, and the first and the second portions of the preamble can be examples of the first and the second portions 622 and 624, respectively, described with reference to FIG. 6B. As another example in which the second portion includes at least two symbols, the packet can be an example of the PDU 600, and the first and the second portions of the preamble can be examples of the first and the second portions 602 and 604, respectively, described with reference to FIG. 6A.

The process 1200 proceeds in block 1204 with modulating each of the plurality of symbols in the first portion according to a BPSK modulation scheme, and in block 1206, with modulating the first symbol in the second portion immediately following the last symbol in the first portion according to a BPSK modulation scheme. In block 1208, the process proceeds with generating a physical layer payload of the packet including a plurality of symbols, and in block 1210, with modulating the plurality of symbols in the payload according to an MC-OOK modulation scheme. In some implementations, the modulated packet is then output for transmission to at least one second wireless communication device in block 1212.

In some implementations, the first portion of the preamble is a legacy portion that includes an L-STF, followed by an L-LTF, which is followed by an L-SIG. For example, in some implementations, the first portion is generated according to the IEEE 802.11a communication protocol. In some implementations, the second portion of the preamble may include only one symbol, such as the Mark1 symbol 624 of the PDU 620. For example, the wireless communication device may generate and modulate the one symbol in the second portion in blocks 1202 and 1206 in the form of a High Efficiency (HE) WLAN RL-SIG according to the IEEE 802.11ax communication protocol. In some other implementations, the second portion of the preamble may include two or more symbols. For example, the wireless communication device may generate and modulate the second portion in blocks 1202 and 1206 in the form of a one-symbol RL-SIG followed by a two-symbol HE signaling field (HE-SIG-A) according to the IEEE 802.11ax communication protocol as, for example, shown in FIG. 3B. In some implementations, the payload is generated according to the IEEE 802.11ba communication protocol and includes a WUR Beacon frame, a WUR Wake-up frame, a WUR Discovery frame or a WUR Vendor Specific frame.

In some implementations, the first portion of the preamble is generated in block 1202 to include one or more symbols defining a data rate field and one or more symbols defining a length field (note that the data rate indicated in the data rate field may not be the actual data rate of the data carried in the payload). In some implementations, the data rate field in the first portion of the preamble is generated to indicate a data rate of 6 Mbps, and the length field is generated to indicate a modulus 3 of 1 or 2.

Figure 13:
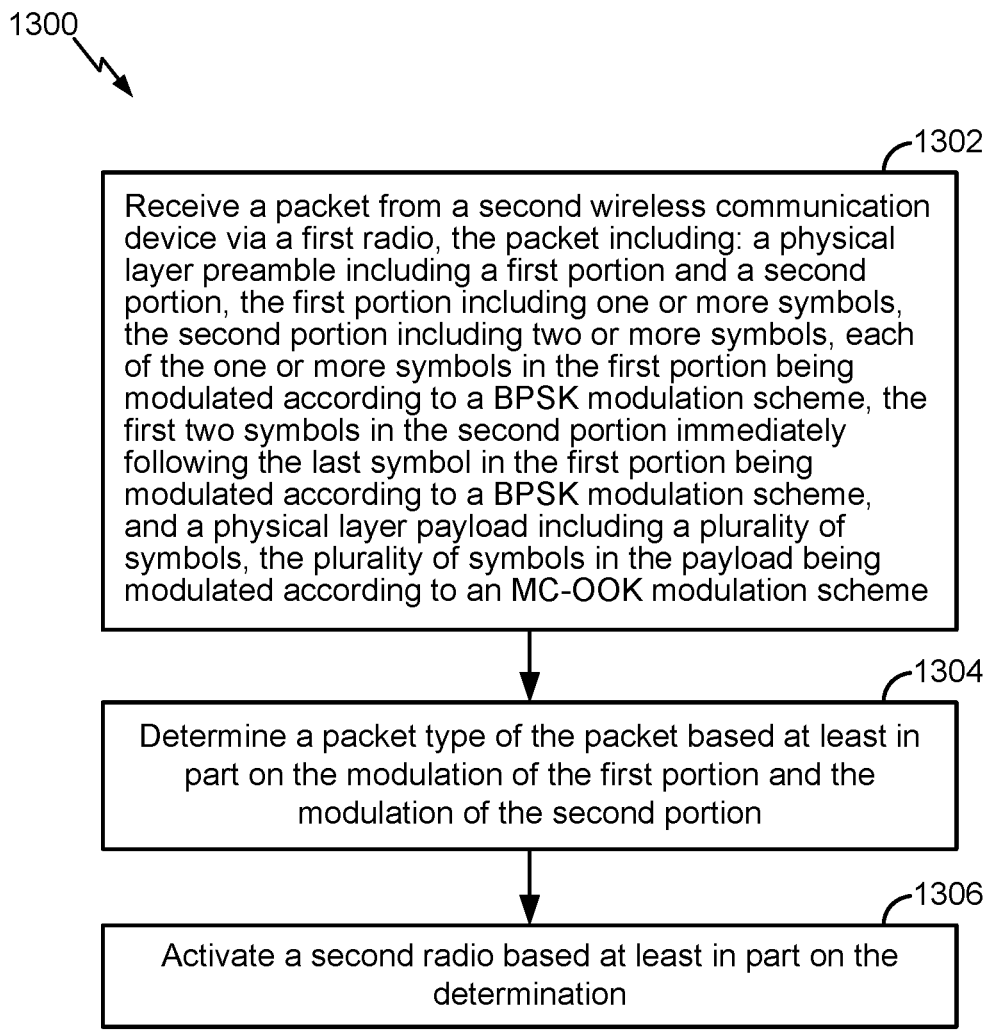
FIG. 13 shows a flowchart illustrating an example process for wireless communication according to some implementations.

FIG. 13 shows a flowchart illustrating an example process 1300 for wireless communication according to some implementations. In some implementations, the process 1300 may be used by a wireless communication device to wake up or otherwise activate a primary radio based on a wake-up signal received from a second wireless communication device via a secondary radio to enable bi-directional communications with the second wireless communication device. For example, the process 1300 may be performed by a wireless communication device configured to receive and decode wake-up signals such as, for example, Wake-Up Radio (WUR) packets generated and transmitted according to IEEE 802.11ba. The process 1300 can be performed by a wireless communication device such as the wireless communication device 400 described above with reference to FIG. 4. In some such implementations, the process 1300 may be performed by a wireless communication device operating within a STA, such as one of the STAs 104 and 504 described above with reference to FIGS. 1 and 5B, respectively.

In some implementations, the process 1300 begins in block 1302 with receiving a packet from a second wireless communication device via a first radio (for example, a secondary low-power radio). The received packet includes a physical layer preamble including a first portion and a second portion. The first portion includes one or more symbols and the second portion includes two or more symbols. Each of the one or more symbols in the first portion is modulated according to a BPSK modulation scheme. The first two symbols in the second portion immediately following the last symbol in the first portion also are modulated according to a BPSK modulation scheme. The received packet further includes a physical layer payload including a plurality of symbols modulated according to an MC-OOK modulation scheme. For example, the packet received in block 1302 can be an example of the PDU 600, and the first and the second portions of the preamble can be examples of the first and the second portions 602 and 604, respectively, described with reference to FIG. 6A. In some implementations, the first portion is a legacy portion that includes an L-STF, followed by an L-LTF, which is followed by an L-SIG. For example, the first portion may be generated according to the IEEE 802.11a communication protocol. In some implementations, the payload is generated according to the IEEE 802.11ba communication protocol and includes a WUR Beacon frame, a WUR Wake-up frame, a WUR Discovery frame or a WUR Vendor Specific frame.

The process 1300 proceeds in block 1304 with determining a packet type of the packet based at least in part on the modulation of the first portion and the modulation of the second portion. In some implementations, the packet type may be one of a legacy packet type according to IEEE 802.11a (hereinafter a "legacy packet"), a High Throughput (HT) packet type according to IEEE 802.11n (hereinafter an "HT packet"), a Very High Throughput (VHT) packet type according to IEEE 802.11ac (hereinafter a "VHT packet"), a High Efficiency (HE) WLAN packet type according to IEEE 802.11ax (hereinafter an "HE packet") or a WUR packet type according to IEEE 802.11ba (hereinafter a "WUR packet"). In some implementations, the wireless communication device may determine that the packet received in block 1302 is a wake-up packet (for example, a WUR packet) having a payload that includes a wake-up frame based on determining that the first portion is modulated according to a BPSK modulation scheme and determining that the first two symbols in the second portion are modulated according to a BPSK modulation scheme. In some implementations, the wireless communication device determines the packet type in block 1304 further based on determining that the payload is modulated according to an MC-OOK modulation scheme. For example, the wireless communication device may determine that the packet is a wake-up packet based on determining that the first portion is modulated according to a BPSK modulation scheme, determining that the first two symbols in the second portion are modulated according to a BPSK modulation scheme, and determining that the payload is modulated according to an MC-OOK modulation scheme.

The process 1300 may then proceed in block 1306 with activating a second radio (for example, a primary radio) based at least in part on the determination in block 1304. For example, the wireless communication device may decode the payload of the received packet in response to determining that the packet is a wake-up packet. Subsequently, if the wireless communication device determines, based on the decoded payload, that the packet includes a wake-up frame addressed to the wireless communication device, the wireless communication device may then activate the second radio in block 1306 enabling the wireless communication device to communicate bi-directionally with the second wireless communication device.

In some implementations, in contrast to the wireless communication device receiving the packet in block 1302, legacy wireless communication devices that are compatible with communicating legacy packets, but not compatible with communicating HT, VHT, HE or WUR packets, will interpret the packet as a legacy packet as a result of the BPSK modulation of the first symbol in the second portion. Wireless communication devices that are compatible with communicating legacy and HT packets, but not compatible with communicating VHT, HE or WUR packets, will also interpret the packet as a legacy packet as a result of the BPSK modulation of the first symbol in the second portion. Wireless communication devices that are compatible with communicating legacy, HT and VHT packets, but not compatible with communicating HE or WUR packets, will interpret the packet as a legacy packet as a result of the BPSK modulation of the first two symbols in the second portion. Wireless communication devices that are compatible with communicating legacy, HT, VHT and HE packets, but not compatible with communicating WUR packets, will interpret the packet as a legacy packet based at least in part on the BPSK modulation of the first two symbols in the second portion.

In some implementations, the second portion of the preamble may include only two symbols, such as the Mark1 and Mark2 symbols 614 and 616 of the PDU 600. In some implementations, the second symbol in the second portion is identical to the first symbol in the second portion. In some other implementations, tones in the second symbol carry different information than corresponding tones in the first symbol. In some implementations, the second portion includes a repeat of one of the symbols in the first portion. For example, the first symbol in the second portion can be an RL-SIG that immediately follows the L-SIG in the first portion. Alternatively, the first symbol in the second portion may be modulated using a different waveform than the waveform used to modulate the last symbol in the first portion. For example, the last symbol in the first portion may include a first set of code bits and the first symbol in the second portion may include a second set of code bits that are the logical complement of the first set of code bits. In some implementations, the wireless communication device determines the packet type in block 1304 further based on determining that the first symbol in the second portion is modulated using a different waveform than the waveform used to modulate the last symbol in the first portion. In some implementations, a determination that the first symbol in the second portion is modulated using a different waveform than the waveform used to modulate the last symbol in the first portion may also indicate that the packet is a WUR packet as opposed to an HE packet.

In some implementations, the first portion of the preamble includes one or more symbols defining a data rate field and one or more symbols defining a length field (note that the data rate indicated in the data rate field may not be the actual data rate of the data carried in the payload). In some implementations, the wireless communication device determines the packet type in block 1304 further based on at least one of the data rate field or the length field. In some implementations, the data rate field in the first portion indicates a data rate of 6 Mbps, and the length field indicates a modulus 3 of 0. In some implementations, the indication of the modulus 3 of 0 may also indicate to the wireless communication device that the packet is a WUR packet as opposed to an HE packet. Additionally, the indication of the modulus 3 of 0 may also indicate to devices compatible with communicating HE packets, but not compatible with communicating WUR packets, to interpret the packet as a legacy packet.

In some other implementations, the data rate field in the first portion of the preamble indicates a data rate of 6 Mbps, and the length field indicates a modulus 3 of 1 or 2. In some such implementations in which the modulus 3 is 1 or 2, the first symbol in the second portion may be modulated using a different waveform than the waveform used to modulate the last symbol in the first portion. For example, the last symbol in the first portion may include a first set of code bits and the first symbol in the second portion may include a second set of code bits that are the logical complement of the first set of code bits. Again, the determination that the first symbol in the second portion is modulated using a different waveform than the waveform used to modulate the last symbol in the first portion may also indicate that the packet is a WUR packet as opposed to an HE packet. In contrast, wireless communication devices that are compatible with communicating HE packets, but not compatible with communicating WUR packets, will interpret the packet as an 802.11a packet based at least in part on the first symbol in the second portion not being modulated using the same waveform as the waveform used to modulate the last symbol in the first portion.

In yet other implementations, the data rate field in the first portion may indicate a data rate of 9 Mbps. In such 9 Mbps implementations, the length field may indicate a modulus 3 of, for example, 0, 1 or 2. In some implementations, the indication of the data rate of 9 Mbps may also indicate to the wireless communication device that the packet is a WUR packet. Additionally, the indication of the data rate of 9 Mbps may also indicate to devices compatible with communicating one or more of HT, VHT and HE packets, but not compatible with communicating WUR packets, to interpret the packet as a legacy packet.

Figure 14:
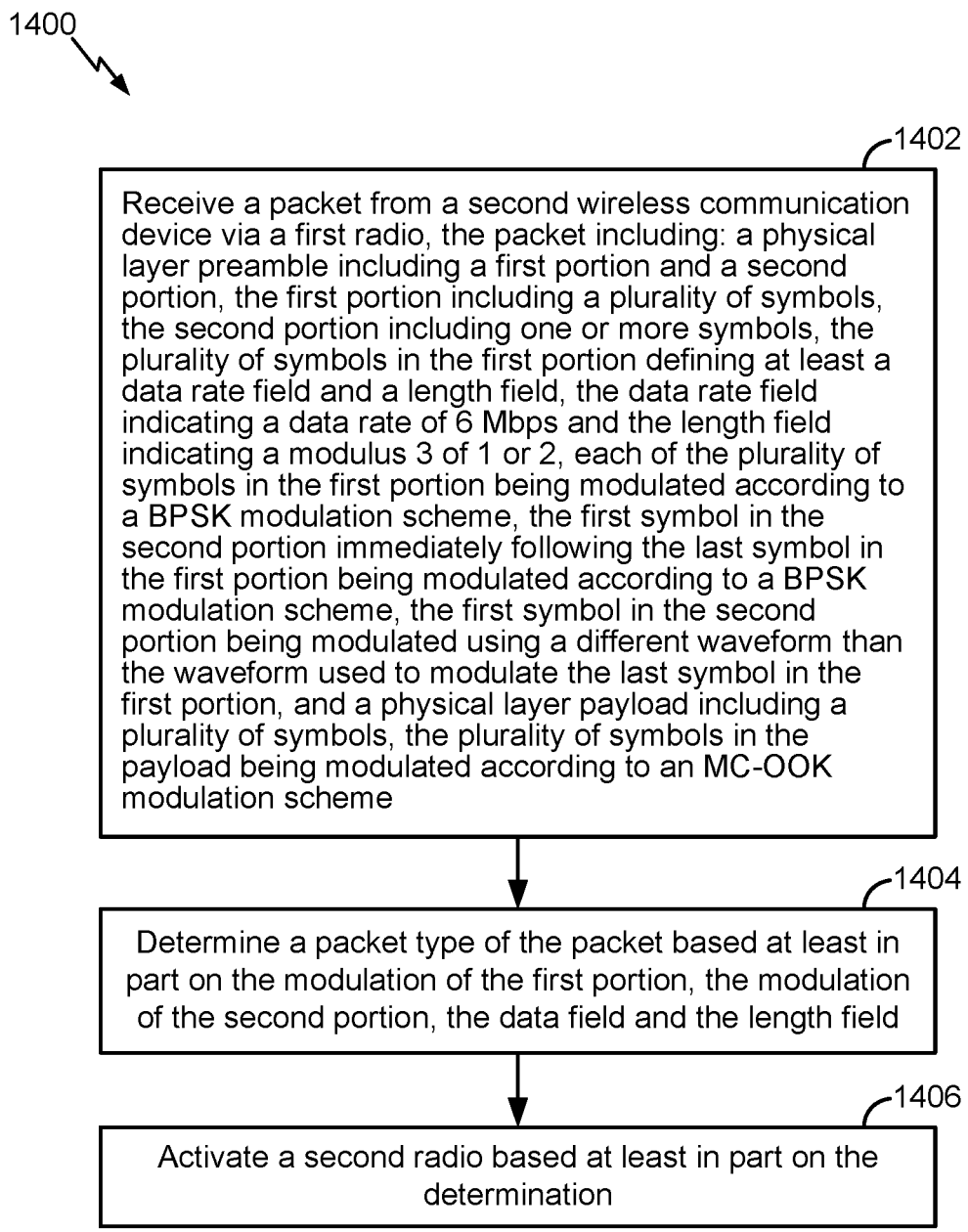
FIG. 14 shows a flowchart illustrating an example process for wireless communication according to some implementations.

FIG. 14 shows a flowchart illustrating an example process 1400 for wireless communication according to some implementations. In some implementations, the process 1400 may be used by a wireless communication device to wake up or otherwise activate a primary radio based on a wake-up signal received from a second wireless communication device via a secondary radio to enable bi-directional communications with the second wireless communication device. For example, the process 1400 may be performed by a wireless communication device configured to receive and decode wake-up signals such as, for example, WUR packets generated and transmitted according to IEEE 802.11ba. The process 1400 can be performed by a wireless communication device such as the wireless communication device 400 described above with reference to FIG. 4. In some such implementations, the process 1400 may be performed by a wireless communication device operating within a STA, such as one of the STAs 104 and 504 described above with reference to FIGS. 1 and 5B, respectively.

In some implementations, the process 1400 begins in block 1402 with receiving a packet from a second wireless communication device via a first radio (for example, a secondary low-power radio). The received packet includes a physical layer preamble including a first portion and a second portion. The first portion includes a plurality of symbols and the second portion includes one or more symbols. The plurality of symbols in the first portion includes one or more symbols defining a data rate field and one or more symbols defining a length field. In some implementations, the data rate field in the first portion indicates a data rate of 6 Mbps, and the length field indicates a modulus 3 of 1 or 2 (note that the data rate indicated in the data rate field may not be the actual data rate of the data carried in the payload). Each of the symbols in the first portion is modulated according to a BPSK modulation scheme. The first symbol (which may be the only symbol) in the second portion immediately following the last symbol in the first portion also is modulated according to a BPSK modulation scheme. While both are modulated with a BPSK modulation scheme, the first symbol in the second portion is modulated using a different waveform than the waveform used to modulate the last symbol in the first portion. For example, the last symbol in the first portion may include a first set of code bits and the first symbol in the second portion may include a second set of code bits that are the logical complement of the first set of code bits.

The received packet further includes a physical layer payload including a plurality of symbols modulated according to an MC-OOK modulation scheme. For example, the packet received in block 1402 can be an example of the PDU 600, and the first and the second portions of the preamble can be examples of the first and the second portions 602 and 604, respectively, described with reference to FIG. 6A. As another example, the packet can be an example of the PDU 620, and the first and the second portions of the preamble can be examples of the first and the second portions 622 and 624, respectively, described with reference to FIG. 6B. In some implementations, the first portion is a legacy portion that includes an L-STF, followed by an L-LTF, which is followed by an L-SIG. For example, the first portion may be generated according to the IEEE 802.11a communication protocol. In some implementations, the payload is generated according to the IEEE 802.11ba communication protocol and includes a WUR Beacon frame, a WUR Wake-up frame, a WUR Discovery frame or a WUR Vendor Specific frame.

The process 1400 proceeds in block 1404 with determining a packet type of the packet based at least in part on the modulation of the first portion, the modulation of the second portion, the data rate field and the length field. In some implementations, the packet type may be one of a legacy packet type, an HT packet type a VHT packet type, an HE packet type or a WUR packet type. In some implementations, the wireless communication device may determine that the packet received in block 1402 is a wake-up packet (for example, a WUR packet) having a payload that includes a wake-up frame based on determining that the first portion is modulated according to a BPSK modulation scheme, determining that the first symbol in the second portion is modulated according to a BPSK modulation scheme, determining that the data rate field indicates a data rate of 6 Mbps, determining that the length field indicates a modulus 3 of 1 or 2, and determining that the first symbol in the second portion is modulated using a different waveform than the waveform used to modulate the last symbol in the first portion. For example, the last symbol in the first portion may include a first set of code bits and the first symbol in the second portion may include a second set of code bits that are the logical complement of the first set of code bits. In some implementations, the wireless communication device determines the packet type in block 1404 further based on determining that the payload is modulated according to an MC-OOK modulation scheme.

The process 1400 may then proceed in block 1406 with activating a second radio (for example, a primary radio) based at least in part on the determination in block 1404. For example, the wireless communication device may decode the payload of the received packet in response to determining that the packet is a wake-up packet. Subsequently, if the wireless communication device determines, based on the decoded payload, that the packet includes a wake-up frame addressed to the wireless communication device, the wireless communication device may then activate the second radio in block 1406 enabling the wireless communication device to communicate bi-directionally with the second wireless communication device.

In some implementations, in contrast to the wireless communication device receiving the packet in block 1402, legacy wireless communication devices that are compatible with communicating legacy packets, but not compatible with communicating HT, VHT, HE or WUR packets, will interpret the packet as a legacy packet as a result of the BPSK modulation of the first symbol in the second portion. Wireless communication devices that are compatible with communicating legacy and HT packets, but not compatible with communicating VHT, HE or WUR packets, will also interpret the packet as a legacy packet as a result of the BPSK modulation of the first symbol in the second portion. Wireless communication devices that are compatible with communicating legacy, HT and VHT packets, but not compatible with communicating HE or WUR packets, will interpret the packet as a legacy packet as a result of the BPSK modulation of the first symbol in the second portion and the length field indicating a modulus 3 of 1 or 2. Wireless communication devices that are compatible with communicating legacy, HT, VHT and HE packets, but not compatible with communicating WUR packets, will interpret the packet as a legacy packet based at least in part on the BPSK modulation of the first symbol in the second portion, the length field indicating a modulus 3 of 1 or 2, and the first symbol in the second portion being modulated using a different waveform than the waveform used to modulate the last symbol in the first portion.

Figure 15:
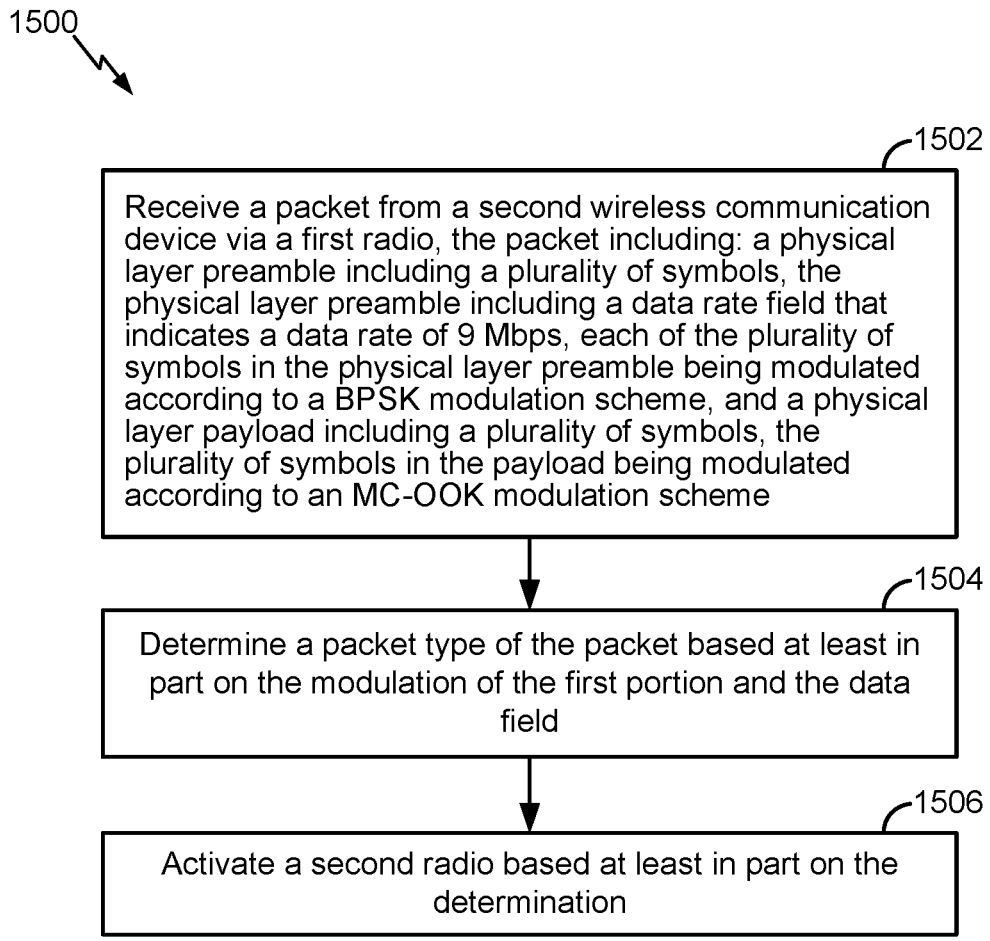
FIG. 15 shows a flowchart illustrating an example process for wireless communication according to some implementations.

FIG. 15 shows a flowchart illustrating an example process 1500 for wireless communication according to some implementations. In some implementations, the process 1500 may be used by a wireless communication device to wake up or otherwise activate a primary radio based on a wake-up signal received from a second wireless communication device via a secondary radio to enable bi-directional communications with the second wireless communication device. For example, the process 1500 may be performed by a wireless communication device configured to receive and decode wake-up signals such as, for example, WUR packets generated and transmitted according to IEEE 802.11ba. The process 1500 can be performed by a wireless communication device such as the wireless communication device 400 described above with reference to FIG. 4. In some such implementations, the process 1500 may be performed by a wireless communication device operating within a STA, such as one of the STAs 104 and 504 described above with reference to FIGS. 1 and 5B, respectively.

In some implementations, the process 1500 begins in block 1502 with receiving a packet from a second wireless communication device via a first radio (for example, a secondary low-power radio). The received packet includes a physical layer preamble including a plurality of symbols. The plurality of symbols in the preamble includes one or more symbols defining a data rate field. In some implementations, the data rate field in the first portion indicates a data rate of 9 Mbps (note that the data rate indicated in the data rate field may not be the actual data rate of the data carried in the payload). Each of the plurality of symbols in the preamble is modulated according to a BPSK modulation scheme. The received packet further includes a physical layer payload including a plurality of symbols modulated according to an MC-OOK modulation scheme. For example, the packet received in block 1502 can be an example of the PDU 600, the PDU 620, or the PDU40 described with reference to FIGS. 6A, 6B and 6C, respectively. In some implementations, the payload is generated according to the IEEE 802.11ba communication protocol and includes a WUR Beacon frame, a WUR Wake-up frame, a WUR Discovery frame or a WUR Vendor Specific frame.

The process 1500 proceeds in block 1504 with determining a packet type of the packet based at least in part on the modulation of the first portion and the modulation of the second portion. In some implementations, the packet type may be one of a legacy packet type, an HT packet type, a VHT packet type, an HE packet type or a WUR packet type. In some implementations, the wireless communication device may determine that the packet received in block 1502 is a wake-up packet (for example, a WUR packet) having a payload that includes a wake-up frame based on determining that the first portion is modulated according to a BPSK modulation scheme and determining that the data rate field indicates a data rate of 9 Mbps. In some implementations, the wireless communication device determines the packet type in block 1504 further based on determining that the payload is modulated according to an MC-OOK modulation scheme. For example, the wireless communication device may determine that the packet is a wake-up packet based on determining that the first portion is modulated according to a BPSK modulation scheme, determining that data rate indicates 9 Mbps, and determining that the payload is modulated according to an MC-OOK modulation scheme.

The process 1500 may then proceed in block 1506 with activating a second radio (for example, a primary radio) based at least in part on the determination in block 1504. For example, the wireless communication device may decode the payload of the received packet in response to determining that the packet is a wake-up packet. Subsequently, if the wireless communication device determines, based on the decoded payload, that the packet includes a wake-up frame addressed to the wireless communication device, the wireless communication device may then activate the second radio in block 1506 enabling the wireless communication device to communicate bi-directionally with the second wireless communication device.

In some implementations, in contrast to the wireless communication device receiving the packet in block 1502, legacy wireless communication devices that are compatible with communicating legacy packets, but not compatible with communicating HT, VHT, HE or WUR packets, will interpret the packet as a legacy packet as a result of the BPSK modulation of the preamble and the indication of the 9 Mbps data rate. Wireless communication devices that are compatible with communicating legacy and HT packets, but not compatible with communicating VHT, HE or WUR packets, will also interpret the packet as a legacy packet as a result of the BPSK modulation of the preamble and the indication of the 9 Mbps data rate. Wireless communication devices that are compatible with communicating legacy, HT and VHT packets, but not compatible with communicating HE or WUR packets, will also interpret the packet as a legacy packet as a result of the BPSK modulation of the preamble and the indication of the 9 Mbps data rate. Wireless communication devices that are compatible with communicating legacy, HT, VHT and HE packets, but not compatible with communicating WUR packets, will also interpret the packet as a legacy packet as a result of the BPSK modulation of the preamble and the indication of the 9 Mbps data rate.

In some implementations, the preamble is a legacy preamble that includes an L-STF, followed by an L-LTF, which is followed by an L-SIG. For example, the preamble may be generated according to the IEEE 802.11a communication protocol. In some implementations, the payload immediately follows the L-SIG. In some other implementations, the preamble includes both a first portion that includes the plurality of symbols as well as a second portion that can include one or more symbols. For example, the first portion can be a legacy portion consisting of the L-STF, L-LTF and L-SIG all modulated according to a BPSK modulation scheme. In some implementations, at least the first symbol in the second portion also may be modulated according to a BPSK modulation scheme. In some such implementations, the second portion may include a repeat of one of the symbols in the first portion. For example, the first symbol in the second portion can be an RL-SIG that immediately follows the L-SIG in the first portion. Alternatively, the first symbol in the second portion may be modulated using a different waveform than the waveform used to modulate the last symbol in the first portion. For example, the last symbol in the first portion may include a first set of code bits and the first symbol in the second portion may include a second set of code bits that are the logical complement of the first set of code bits. In some implementations, the wireless communication device determines the packet type in block 1504 further based on determining that the first symbol in the second portion is modulated using a different waveform than the waveform used to modulate the last symbol in the first portion. In some other implementations, at least the first symbol in the second portion may alternatively be modulated according to a Q-BPSK modulation scheme.

Figure 16:
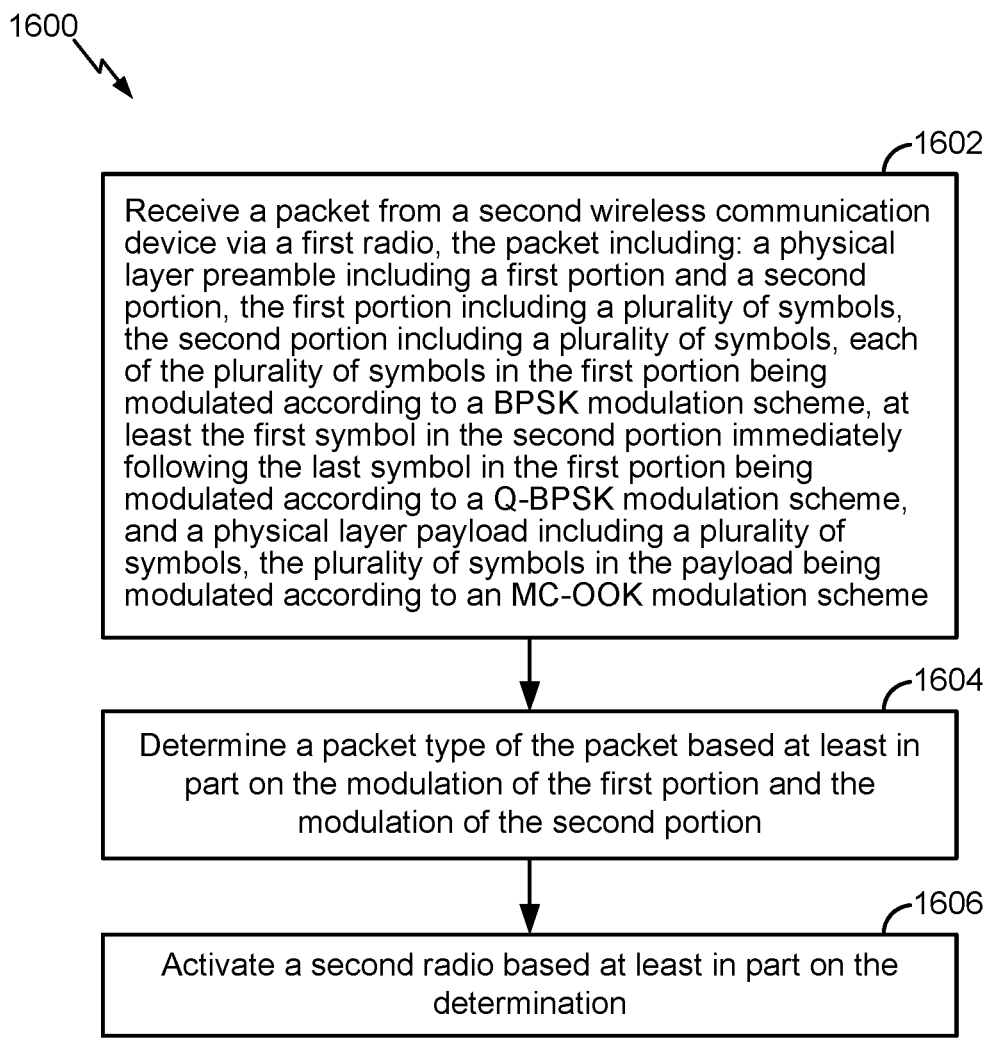
FIG. 16 shows a flowchart illustrating an example process for wireless communication according to some implementations.

FIG. 16 shows a flowchart illustrating an example process 1600 for wireless communication according to some implementations. In some implementations, the process 1600 may be used by a wireless communication device to wake up or otherwise activate a primary radio based on a wake-up signal received from a second wireless communication device via a secondary radio to enable bi-directional communications with the second wireless communication device. For example, the process 1600 may be performed by a wireless communication device configured to receive and decode wake-up signals such as, for example, WUR packets generated and transmitted according to IEEE 802.11ba. The process 1600 can be performed by a wireless communication device such as the wireless communication device 400 described above with reference to FIG. 4. In some such implementations, the process 1600 may be performed by a wireless communication device operating within a STA, such as one of the STAs 104 and 504 described above with reference to FIGS. 1 and 5B, respectively.

In some implementations, the process 1600 begins in block 1602 with receiving a packet from a second wireless communication device via a first radio (for example, a secondary low-power radio). The received packet includes a physical layer preamble including a first portion and a second portion. The first portion includes a plurality of symbols and the second portion includes one or more symbols. Each of the symbols in the first portion is modulated according to a BPSK modulation scheme. At least the first symbol in the second portion immediately following the last symbol in the first portion is modulated according to a Q-BPSK modulation scheme. In some implementations, second portion includes two symbols both modulated according to a Q-BPSK modulation scheme. For example, the second portion can be generated and modulated as an HT-SIG according to the IEEE 802.11n communication protocol.

The received packet further includes a physical layer payload including a plurality of symbols modulated according to an MC-OOK modulation scheme. For example, the packet received in block 1602 can be an example of the PDU 600, and the first and the second portions of the preamble can be examples of the first and the second portions 602 and 604, respectively, described with reference to FIG. 6A. As another example, the packet can be an example of the PDU 620, and the first and the second portions of the preamble can be examples of the first and the second portions 622 and 624, respectively, described with reference to FIG. 6B. In some implementations, the first portion is a legacy portion that includes an L-STF, followed by an L-LTF, which is followed by an L-SIG. For example, the first portion may be generated according to the IEEE 802.11a communication protocol. In some implementations, the payload is generated according to the IEEE 802.11ba communication protocol and includes a WUR Beacon frame, a WUR Wake-up frame, a WUR Discovery frame or a WUR Vendor Specific frame.

The process 1600 proceeds in block 1604 with determining a packet type of the packet based at least in part on the modulation of the first portion and the modulation of the second portion. In some implementations, the packet type may be one of a legacy packet type, an HT packet type, a VHT packet type, an HE packet type or a WUR packet type. In some implementations, the wireless communication device may determine that the packet received in block 1602 is a wake-up packet (for example, a WUR packet) having a payload that includes a wake-up frame based on determining that the first portion is modulated according to a BPSK modulation scheme and determining that at least the first symbol in the second portion is modulated according to a Q-BPSK modulation scheme. In some implementations, the wireless communication device determines the packet type in block 1604 further based on determining that the second symbol in the second portion also is modulated according to a Q-BPSK modulation scheme. Additionally or alternatively, the wireless communication device may determine the packet type in block 1604 further based on determining that the payload is modulated according to an MC-OOK modulation scheme. For example, the wireless communication device may determine that the packet is a wake-up packet based on determining that the first portion is modulated according to a BPSK modulation scheme, determining that the first two symbols in the second portion are modulated according to a Q-BPSK modulation scheme, and determining that the payload is modulated according to an MC-OOK modulation scheme.

The process 1600 may then proceed in block 1606 with activating a second radio (for example, a primary radio) based at least in part on the determination in block 1604. For example, the wireless communication device may decode the payload of the received packet in response to determining that the packet is a wake-up packet. Subsequently, if the wireless communication device determines, based on the decoded payload, that the packet includes a wake-up frame addressed to the wireless communication device, the wireless communication device may then activate the second radio in block 1606 enabling the wireless communication device to communicate bi-directionally with the second wireless communication device.

In some implementations, in contrast to the wireless communication device receiving the packet in block 1602, legacy wireless communication devices that are compatible with communicating legacy packets, but not compatible with communicating HT, VHT, HE or WUR packets, will not decode the packet as a result of the Q-BPSK modulation of at least the first symbol in the second portion. Wireless communication devices that are compatible with communicating legacy and HT packets, but not compatible with communicating VHT, HE or WUR packets, will interpret the packet as an HT packet as a result of the Q-BPSK modulation of the first two symbols in the second portion. Wireless communication devices that are compatible with communicating legacy, HT and VHT packets, but not compatible with communicating HE or WUR packets, will also interpret the packet as an HT packet as a result of the Q-BPSK modulation of the first two symbols in the second portion. Wireless communication devices that are compatible with communicating legacy, HT, VHT and HE packets, but not compatible with communicating WUR packets, will also interpret the packet as an HT packet as a result of the Q-BPSK modulation of the first two symbols in the second portion.

In some implementations, the first portion of the preamble includes one or more symbols defining a data rate field and one or more symbols defining a length field (note that the data rate indicated in the data rate field may not be the actual data rate of the data carried in the payload). In some implementations, the wireless communication device determines the packet type in block 1604 further based on at least one of the data rate field or the length field. In some implementations, the data rate field in the first portion indicates a data rate of 6 Mbps, and the length field indicates a modulus 3 of 0, 1 or 2.

Figure 17:
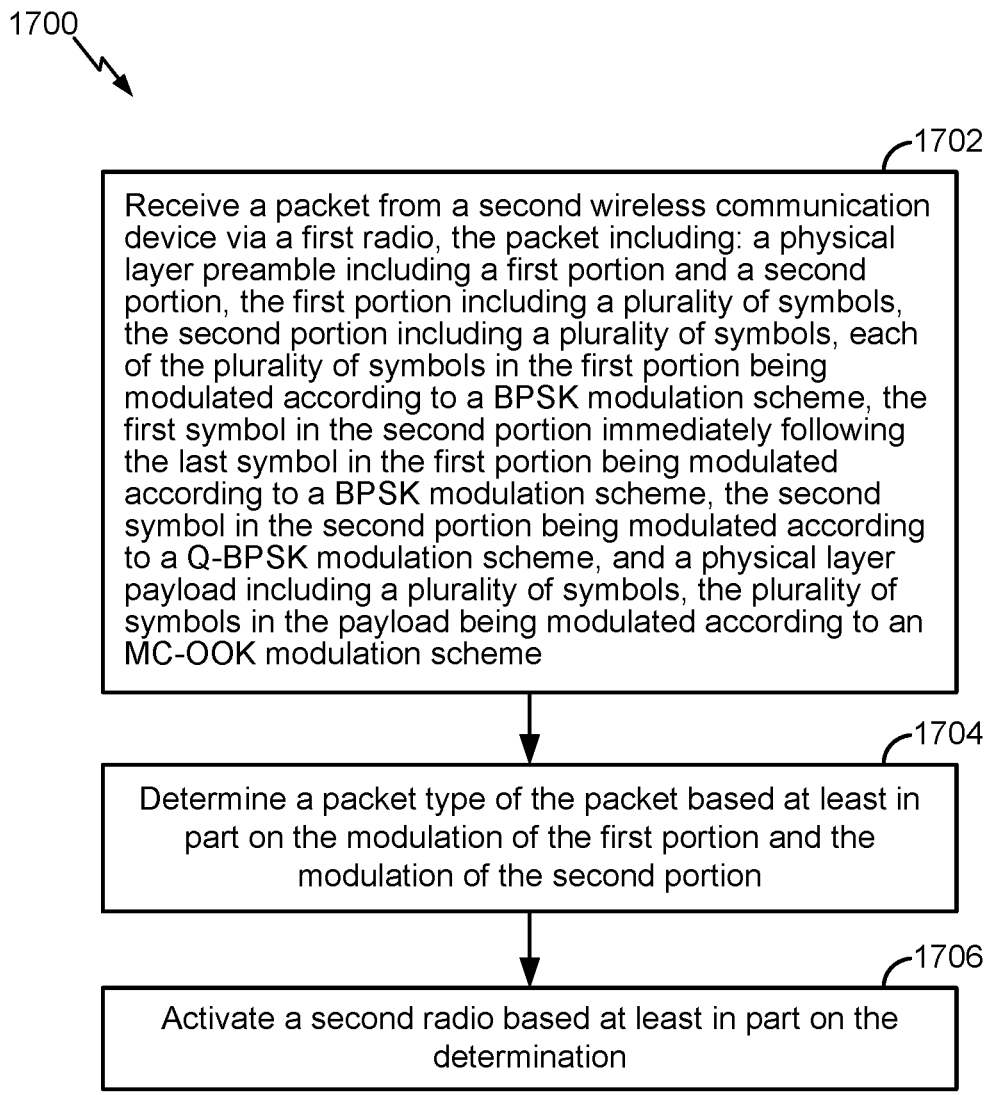
FIG. 17 shows a flowchart illustrating an example process for wireless communication according to some implementations.

FIG. 17 shows a flowchart illustrating an example process 1700 for wireless communication according to some implementations. In some implementations, the process 1700 may be used by a wireless communication device to wake up or otherwise activate a primary radio based on a wake-up signal received from a second wireless communication device via a secondary radio to enable bi-directional communications with the second wireless communication device. For example, the process 1700 may be performed by a wireless communication device configured to receive and decode wake-up signals such as, for example, WUR packets generated and transmitted according to IEEE 802.11ba. The process 1700 can be performed by a wireless communication device such as the wireless communication device 400 described above with reference to FIG. 4. In some such implementations, the process 1700 may be performed by a wireless communication device operating within a STA, such as one of the STAs 104 and 504 described above with reference to FIGS. 1 and 5B, respectively.

In some implementations, the process 1700 begins in block 1702 with receiving a packet from a second wireless communication device via a first radio (for example, a secondary low-power radio). The received packet includes a physical layer preamble including a first portion and a second portion. The first portion includes a plurality of symbols and the second portion includes a plurality of symbols. Each of the symbols in the first portion is modulated according to a BPSK modulation scheme. The first symbol in the second portion immediately following the last symbol in the first portion also is modulated according to a BPSK modulation scheme, but the second symbol in the second portion is modulated according to a Q-BPSK modulation scheme. For example, the second portion can be generated and modulated as a VHT-SIG-A according to the IEEE 802.11ac communication protocol.

The received packet further includes a physical layer payload including a plurality of symbols modulated according to an MC-OOK modulation scheme. For example, the packet received in block 1702 can be an example of the PDU 600, and the first and the second portions of the preamble can be examples of the first and the second portions 602 and 604, respectively, described with reference to FIG. 6A. In some implementations, the first portion is a legacy portion that includes an L-STF, followed by an L-LTF, which is followed by an L-SIG. For example, the first portion may be generated according to the IEEE 802.11a communication protocol. In some implementations, the payload is generated according to the IEEE 802.11ba communication protocol and includes a WUR Beacon frame, a WUR Wake-up frame, a WUR Discovery frame or a WUR Vendor Specific frame.

The process 1700 proceeds in block 1704 with determining a packet type of the packet based at least in part on the modulation of the first portion and the modulation of the second portion. In some implementations, the packet type may be one of a legacy packet type, an HT packet type, a VHT packet type, an HE packet type or a WUR packet type. In some implementations, the wireless communication device may determine that the packet received in block 1702 is a wake-up packet (for example, a WUR packet) having a payload that includes a wake-up frame based on determining that the first portion is modulated according to a BPSK modulation scheme, determining that the first symbol in the second portion is modulated according to a BPSK modulation scheme, and determining that the second symbol in the second portion is modulated according to a Q-BPSK modulation scheme. In some implementations, the wireless communication device may determine the packet type in block 1704 further based on determining that the payload is modulated according to an MC-OOK modulation scheme. For example, the wireless communication device may determine that the packet is a wake-up packet based on determining that the first portion is modulated according to a BPSK modulation scheme, determining that the first symbol in the second portion is modulated according to a BPSK modulation scheme, determining that the second symbol in the second portion is modulated according to a Q-BPSK modulation scheme, and determining that the payload is modulated according to an MC-OOK modulation scheme.

The process 1700 may then proceed in block 1706 with activating a second radio (for example, a primary radio) based at least in part on the determination in block 1704. For example, the wireless communication device may decode the payload of the received packet in response to determining that the packet is a wake-up packet. Subsequently, if the wireless communication device determines, based on the decoded payload, that the packet includes a wake-up frame addressed to the wireless communication device, the wireless communication device may then activate the second radio in block 1706 enabling the wireless communication device to communicate bi-directionally with the second wireless communication device.

In some implementations, in contrast to the wireless communication device receiving the packet in block 1702, legacy wireless communication devices that are compatible with communicating legacy packets, but not compatible with communicating HT, VHT, HE or WUR packets, will interpret the packet as a legacy packet as a result of the BPSK modulation of the first symbol in the second portion. Wireless communication devices that are compatible with communicating legacy and HT packets, but not compatible with communicating VHT, HE or WUR packets, will also interpret the packet as a legacy packet as a result of the BPSK modulation of the first symbol in the second portion. Wireless communication devices that are compatible with communicating legacy, HT and VHT packets, but not compatible with communicating HE or WUR packets, will interpret the packet as a VHT packet as a result of the BPSK modulation of the first symbol in the second portion and the Q-BPSK modulation of the second symbol in the second portion. Wireless communication devices that are compatible with communicating legacy, HT, VHT and HE packets, but not compatible with communicating WUR packets, will also interpret the packet as a VHT packet as a result of the BPSK modulation of the first symbol in the second portion and the Q-BPSK modulation of the second symbol in the second portion.

In some implementations, the first portion of the preamble includes one or more symbols defining a data rate field and one or more symbols defining a length field (note that the data rate indicated in the data rate field may not be the actual data rate of the data carried in the payload). In some implementations, the wireless communication device determines the packet type in block 1704 further based on at least one of the data rate field or the length field. In some implementations, the data rate field in the first portion indicates a data rate of 6 Mbps and the length field indicates a modulus 3 of 0.

Figure 18:
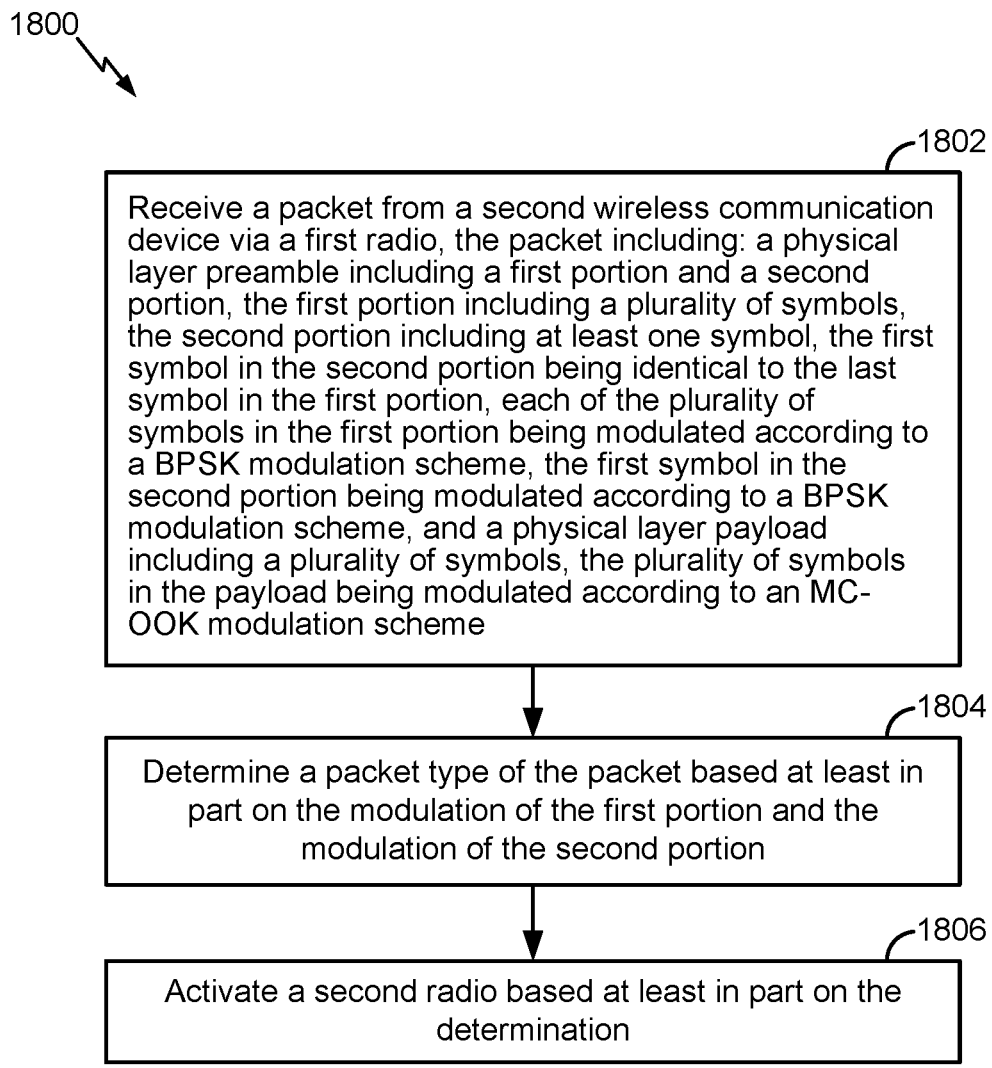
FIG. 18 shows a flowchart illustrating an example process for wireless communication according to some implementations.

FIG. 18 shows a flowchart illustrating an example process 1800 for wireless communication according to some implementations. In some implementations, the process 1800 may be used by a wireless communication device to wake up or otherwise activate a primary radio based on a wake-up signal received from a second wireless communication device via a secondary radio to enable bi-directional communications with the second wireless communication device. For example, the process 1800 may be performed by a wireless communication device configured to receive and decode wake-up signals such as, for example, WUR packets generated and transmitted according to IEEE 802.11ba. The process 1800 can be performed by a wireless communication device such as the wireless communication device 400 described above with reference to FIG. 4. In some such implementations, the process 1800 may be performed by a wireless communication device operating within a STA, such as one of the STAs 104 and 504 described above with reference to FIGS. 1 and 5B, respectively.

In some implementations, the process 1800 begins in block 1802 with receiving a packet from a second wireless communication device via a first radio (for example, a secondary low-power radio). The received packet includes a physical layer preamble including a first portion and a second portion. The first portion includes a plurality of symbols and the second portion includes one or more symbols. Each of the symbols in the first portion is modulated according to a BPSK modulation scheme. At least the first symbol in the second portion immediately following the last symbol in the first portion also is modulated according to a BPSK modulation scheme. In some implementations, the first symbol in the second portion is identical to the last symbol in the first portion. For example, in some implementations in which the first portion is a legacy portion that includes an L-STF, followed by an L-LTF, which is followed by an L-SIG, the second portion can be generated and modulated to include an RL-SIG according to the IEEE 802.11ax communication protocol. In some implementations, the second portion may include additional symbols, which may also be modulated according to a BPSK modulation scheme. For example, in addition to RL-SIG, the second portion may also include an HE-SIG-A.

The received packet further includes a physical layer payload including a plurality of symbols modulated according to an MC-OOK modulation scheme. In some implementations, the payload is generated according to the IEEE 802.11ba communication protocol and includes a WUR Beacon frame, a WUR Wake-up frame, a WUR Discovery frame or a WUR Vendor Specific frame. For example, the packet received in block 1802 can be an example of the PDU 600, and the first and the second portions of the preamble can be examples of the first and the second portions 602 and 604, respectively, described with reference to FIG. 6A. As another example, the packet received in block 1802 can be an example of the PDU 620, and the first and the second portions of the preamble can be examples of the first and the second portions 622 and 624, respectively, described with reference to FIG. 6B. As described above, in some other implementations, the packet may include a second portion that includes more than two symbols.

The process 1800 proceeds in block 1804 with determining a packet type of the packet based at least in part on the modulation of the first portion and the modulation of the second portion. In some implementations, the packet type may be one of a legacy packet type, an HT packet type, a VHT packet type, an HE packet type or a WUR packet type. In some implementations, the wireless communication device may determine that the packet received in block 1802 is a wake-up packet (for example, a WUR packet) having a payload that includes a wake-up frame based on determining that the first portion is modulated according to a BPSK modulation scheme, determining that at least the first symbol in the second portion is modulated according to a BPSK modulation scheme, and determining that the first symbol in the second portion is identical to the last symbol in the first portion. In some implementations, the wireless communication device may determine the packet type in block 1804 further based on determining that the payload is modulated according to an MC-OOK modulation scheme. For example, the wireless communication device may determine that the packet is a wake-up packet based on determining that the first portion is modulated according to a BPSK modulation scheme, determining that at least the first symbol in the second portion is modulated according to a BPSK modulation scheme, determining that the first symbol in the second portion is identical to the last symbol in the first portion, and determining that the payload is modulated according to an MC-OOK modulation scheme.

The process 1800 may then proceed in block 1806 with activating a second radio (for example, a primary radio) based at least in part on the determination in block 1804. For example, the wireless communication device may decode the payload of the received packet in response to determining that the packet is a wake-up packet. Subsequently, if the wireless communication device determines, based on the decoded payload, that the packet includes a wake-up frame addressed to the wireless communication device, the wireless communication device may then activate the second radio in block 1806 enabling the wireless communication device to communicate bi-directionally with the second wireless communication device.

In some implementations, in contrast to the wireless communication device receiving the packet in block 1802, legacy wireless communication devices that are compatible with communicating legacy packets, but not compatible with communicating HT, VHT, HE or WUR packets, will interpret the packet as a legacy packet as a result of the BPSK modulation of the first symbol in the second portion. Wireless communication devices that are compatible with communicating legacy and HT packets, but not compatible with communicating VHT, HE or WUR packets, will also interpret the packet as a legacy packet as a result of the BPSK modulation of the first symbol in the second portion. Wireless communication devices that are compatible with communicating legacy, HT and VHT packets, but not compatible with communicating HE or WUR packets, will also interpret the packet as a legacy packet as a result of the BPSK modulation of the first symbol in the second portion. Wireless communication devices that are compatible with communicating legacy, HT, VHT and HE packets, but not compatible with communicating WUR packets, may interpret the packet as an HE packet as a result of the BPSK modulation of the first symbol in the second portion and based on the first symbol in the second portion being identical to the last symbol in the first portion.

In some implementations, the first portion of the preamble includes one or more symbols defining a data rate field and one or more symbols defining a length field (note that the data rate indicated in the data rate field may not be the actual data rate of the data carried in the payload). In some implementations, the wireless communication device determines the packet type in block 1804 further based on at least one of the data rate field or the length field. In some implementations, the data rate field in the first portion indicates a data rate of 6 Mbps and the length field indicates a modulus 3 of 1 or 2.

Figure 19:
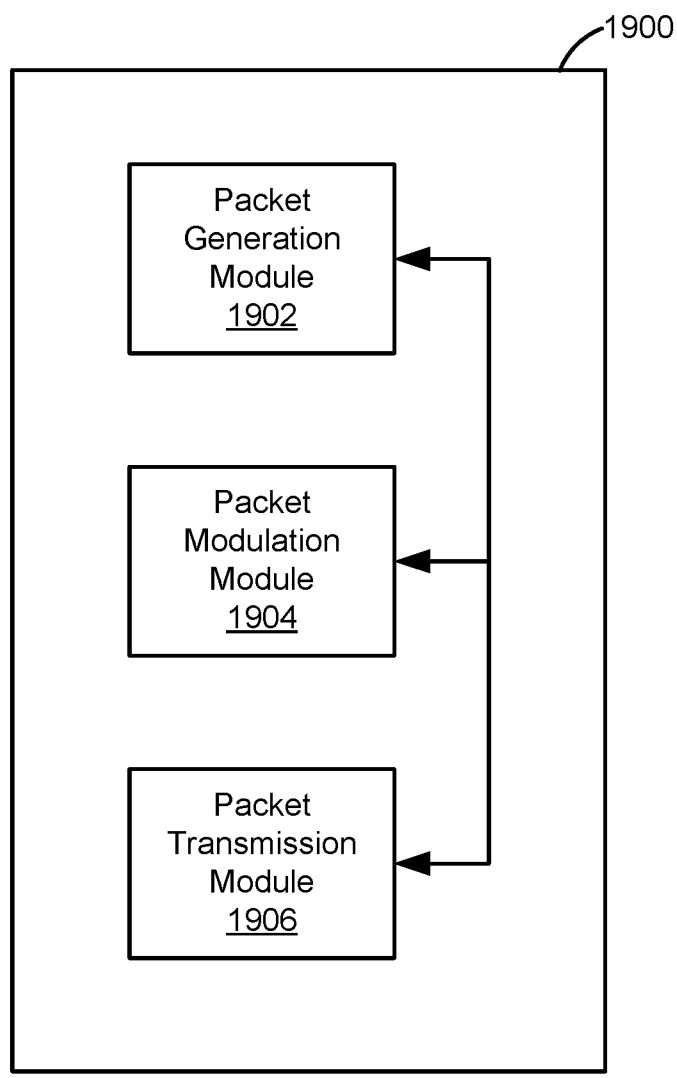
FIG. 19 shows a block diagram of an example wireless communication device for use in wireless communication according to some implementations.

FIG. 19 shows a block diagram of an example wireless communication device 1900 for use in wireless communication according to some implementations. In some implementations, the wireless communication device 1900 is configured to perform one or more of the processes 700, 800, 900, 1000, 1100 or 1200 described with reference to FIGS. 7, 8, 9, 10, 11 and 12, respectively. In some implementations, the wireless communication device 1900 can be an example implementation of the wireless communication device 400 described above with reference to FIG. 4. For example, the wireless communication device 1900 can be a chip, SoC, chipset, package or device that includes at least one processor and at least one modem (for example, a Wi-Fi (IEEE 802.11) modem or a cellular modem). In some such implementations, the wireless communication device 1900 can be a device for use in an AP, such as one of the APs 102 and 502 described above with reference to FIGS. 1 and 5A, respectively. In some other implementations, the wireless communication device 1900 can be an AP that includes such a chip, SoC, chipset, package or device as well as at least one transmitter, at least one receiver, and at least one antenna.

The wireless communication device 1900 includes a packet generation module 1902, a packet modulation module 1904, and a packet transmission module 1906. Portions of one or more of the modules 1902, 1904 and 1906 may be implemented at least in part in hardware or firmware. For example, the packet generation module 1902 may be implemented at least in part by a processor (such as the processor 406) and a modem (such as the modem 402). As another example, the packet modulation module 1904 may be implemented at least in part by a modem (such as the modem 402). As another example, the packet transmission module 1906 may be implemented at least in part by a radio (such as the radio 404). In some implementations, one or more of the modules 1902, 1904 or 1906 are implemented at least in part as software stored in a memory (such as the memory 408). For example, portions of the packet generation module 1902 may be implemented as non-transitory instructions (or "code") executable by a processor (such as the processor 406) to perform the functions or operations of the respective module.

The packet generation module 1902 is configured to generate packets including generating preambles and payloads. For example, the packet generation module 1902 may generate packets including preambles and payloads according to any of the processes 700, 800, 900, 1000, 1100 and 1200 described with reference to FIGS. 7, 8, 9, 10, 11 and 12, respectively. The generation of the packets may include the construction of various types of frames including MAC frames, the coding and multiplexing of data in the frames, and the encapsulation of the frames within a PHY layer PDU such as a PPDU.

The packet modulation module 1904 is configured to modulate the packets, including the preambles and the payloads, generated by the packet generation module 1902. The packet modulation module 1904 may modulate the preambles or payloads according to a BPSK modulation scheme, a Q-BPSK modulation scheme, a QAM modulation scheme, an MC-OOK modulation scheme, or another appropriate modulation scheme. For example, the packet modulation module 1904 may modulate packets including preambles and payloads according to any of the processes 700, 800, 900, 1000, 1100 and 1200 described with reference to FIGS. 7, 8, 9, 10, 11 and 12, respectively.

The packet transmission module 1906 is configured to receive modulated packets from the packet modulation module 1904, to apply various digital signal processing and amplification, and to output the resultant signals for transmission via one or more coupled antennas.

Figure 20:
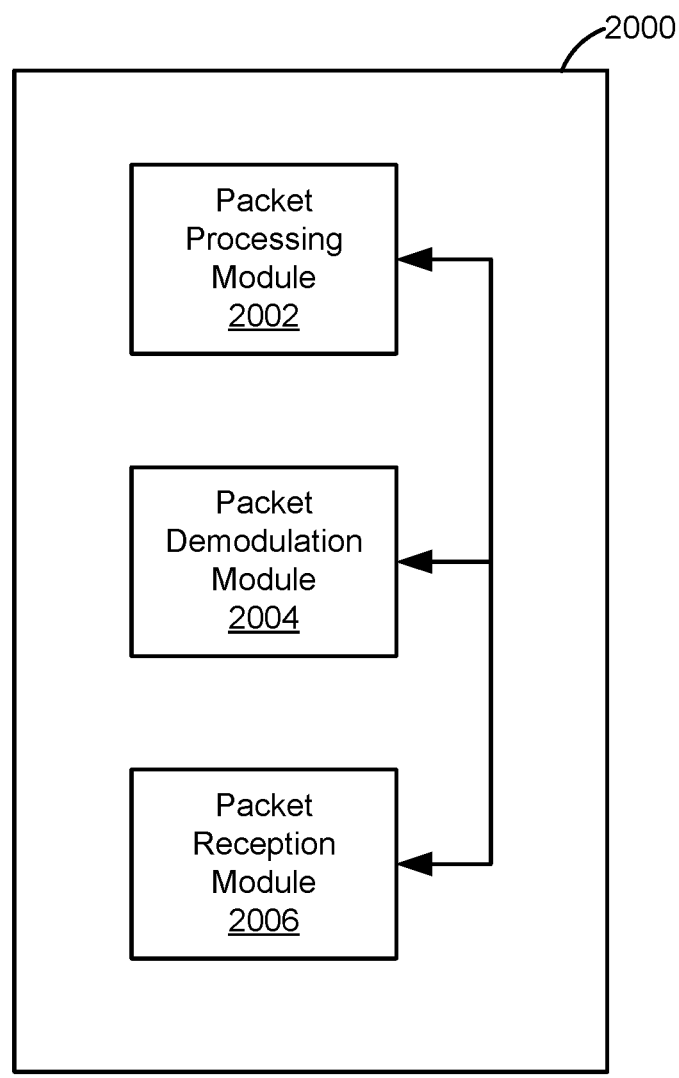
FIG. 20 shows a block diagram of an example wireless communication device for use in wireless communication according to some implementations.

FIG. 20 shows a block diagram of an example wireless communication device 2000 for use in wireless communication according to some implementations. In some implementations, the wireless communication device 2000 is configured to perform one or more of the processes 1300, 1400, 1500, 1600, 1700 or 1800 described with reference to FIGS. 13, 14, 15, 16, 17 and 18, respectively. In some implementations, the wireless communication device 2000 can be an example implementation of the wireless communication device 400 described above with reference to FIG. 4. For example, the wireless communication device 2000 can be a chip, SoC, chipset, package or device that includes at least one processor and at least one modem (for example, a Wi-Fi (IEEE 802.11) modem or a cellular modem). In some such implementations, the wireless communication device 2000 can be a device for use in a STA, such as one of the STAs 104 and 504 described above with reference to FIGS. 1 and 5B, respectively. In some other implementations, the wireless communication device 2000 can be a STA that includes such a chip, SoC, chipset, package or device as well as at least one transmitter, at least one receiver, and at least one antenna.

The wireless communication device 2000 includes a packet processing module 2002, a packet demodulation module 2004, and a packet reception module 2006. Portions of one or more of the modules 2002, 2004 and 2006 may be implemented at least in part in hardware or firmware. For example, the packet processing module 2002 may be implemented at least in part by a processor (such as the processor 406) and a modem (such as the modem 402). As another example, the packet demodulation module 2004 may be implemented at least in part by a modem (such as the modem 402). As another example, the packet reception module 2006 may be implemented at least in part by at least one radio (such as the radio 404). In some implementations, one or more of the modules 2002, 2004 or 2006 are implemented at least in part as software stored in a memory (such as the memory 408). For example, portions of the packet processing module 2002 may be implemented as non-transitory instructions (or "code") executable by a processor (such as the processor 406) to perform the functions or operations of the respective module.

The packet reception module 2006 is configured to receive modulated packets from one or more coupled antennas, to apply various digital signal processing and amplification, and to provide the resultant signals to the packet demodulation module 2004 for demodulation. In some implementations, the packet reception module 2006 includes both a primary radio as well as a secondary, low-power radio.

The packet demodulation module 2004 is configured to demodulate the packets, including the preambles and the payloads, provided by the packet reception module 2006. The packet demodulation module 2004 may determine a modulation scheme used to modulate the preambles or payloads and demodulate the symbols in the preambles or payloads accordingly, for example, according to a BPSK modulation scheme, a Q-BPSK modulation scheme, a QAM modulation scheme, an MC-OOK modulation scheme, or another appropriate modulation scheme. For example, the packet demodulation module 2004 may demodulate packets including preambles and payloads according to any of the processes 1300, 1400, 1500, 1600, 1700 or 1800 described with reference to FIGS. 13, 14, 15, 16, 17 and 18, respectively.

The packet processing module 2002 is configured to determine a packet type of a received packet based on one or more of a modulation of the preamble, a modulation of the payload, a data rate or a modulus 3 of a length field of the packet. For example, the packet processing module 2002 may determine a packet type of a received packet according to any of the processes 1300, 1400, 1500, 1600, 1700 or 1800 described with reference to FIGS. 13, 14, 15, 16, 17 and 18, respectively. For example, the packet processing module 2002 may determine the packet type from a set of packet types including a legacy packet type, an HT packet type, a VHT packet type, an HE packet type and a WUR packet type. In some implementations, the packet processing module 2002 is configured to wake up, turn on, activate or otherwise enable a primary radio of the packet reception module 2006 from a sleep, off, low-power or deactivated state such that the STA is capable of transmitting and receiving signals to and from other wireless communication devices including an associated AP using the primary radio.

The packet processing module 2002 is also configured to process demodulated packets received from the packet demodulation module 2004. For example, the processing may include the demultiplexing and decoding of data from the demodulated packets. In some implementations, the packet processing module 2002 determines whether to demultiplex or decode the data in the payload based on the type of the packet identified by the packet demodulation module 2004. In some implementations, the packet processing module 2002 may further determine whether to decode the data in the payload based on whether the STA's address is indicated in a header of the packet.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication by a wireless communication device, comprising:
generating a physical layer preamble of a packet, the physical layer preamble including a first portion and a second portion, the first portion including one or more symbols, the second portion including two or more symbols;
modulating each of the one or more symbols in the first portion according to a binary phase shift keying (BPSK) modulation scheme;
modulating a first two symbols in the second portion immediately following a last symbol in the first portion according to a BPSK modulation scheme;
generating a physical layer payload of the packet including a plurality of symbols;
modulating the plurality of symbols in the payload according to a multicarrier on-off keying (MC-OOK) modulation scheme; and
outputting the modulated packet for transmission to at least one wireless communication device.

2. The method of claim 1, wherein the second symbol in the second portion is a repeat of the first symbol in the second portion.

3. The method of claim 1, wherein the last symbol in the first portion includes a first set of code bits, and wherein the first symbol in the second portion includes a second set of code bits, the second set of code bits being based on the first set of code bits.

4. The method of claim 3, wherein the second set of code bits are the logical complement of the first set of code bits.

5. The method of claim 1, wherein the first portion includes a data rate field and a length field, the data rate field indicating a data rate of 6 Megabits per second (Mbps) and the length field indicating a modulus 3 of 0.

6. The method of claim 1, wherein the first portion is a legacy portion including a legacy short training field (L-STF), followed by a legacy long training field (L-LTF) and followed by a legacy signaling field (L-SIG) having a single symbol, the last symbol in the first portion being the single symbol of the L-SIG.

7. A method for wireless communication by a wireless communication device, comprising:
receiving a packet from a second wireless communication device via a first radio, the packet including:
a physical layer preamble including a first portion and a second portion, the first portion including one or more symbols, the second portion including two or more symbols, each of the one or more symbols in the first portion being modulated according to a binary phase shift keying (BPSK) modulation scheme, a first two symbols in the second portion immediately following a last symbol in the first portion being modulated according to a BPSK modulation scheme, and
a physical layer payload including a plurality of symbols, the plurality of symbols in the payload being modulated according to a multicarrier on-off keying (MC-OOK) modulation scheme; and
determining a packet type of the packet based at least in part on the modulation in the first portion and the modulation in the second portion.

8. The method of claim 7, wherein the determination of the packet type is further based on the modulation of the physical layer payload.

9. The method of claim 7, wherein a second symbol in the second portion is identical to the first symbol in the second portion.

10. The method of claim 7, wherein the last symbol in the first portion includes a first set of code bits, and wherein the first symbol in the second portion includes a second set of code bits, the second set of code bits being based on the first set of code bits.

11. The method of claim 10, wherein the second set of code bits are the logical complement of the first set of code bits.

12. The method of claim 7, wherein the first portion includes a data rate field and a length field, and wherein the determination of the packet type is further based on the data rate field indicating a data rate of 6 Megabits per second (Mbps) or the length field indicating a modulus 3 of 0.

13. The method of claim 7, wherein the first portion is a legacy portion including a legacy short training field (L-STF), followed by a legacy long training field (L-LTF) and followed by a legacy signaling field (L-SIG) having a single symbol, the last symbol in the first portion being the single symbol of the L-SIG.

14. A wireless communication device, comprising:
at least one modem;
at least one processor; and
at least one memory communicatively coupled with the at least one processor and storing processor-readable code that, when executed by the at least one processor, causes the wireless communication device to:
generate a physical layer preamble of a packet, the physical layer preamble including a first portion and a second portion, the first portion including one or more symbols, the second portion including two or more symbols;
modulate each of the one or more symbols in the first portion according to a binary phase shift keying (BPSK) modulation scheme;
modulate a first two symbols in the second portion immediately following a last symbol in the first portion according to a BPSK modulation scheme;
generate a physical layer payload of the packet including a plurality of symbols;
modulate the plurality of symbols in the payload according to a multicarrier on-off keying (MC-OOK) modulation scheme; and
output the modulated packet for transmission to at least one wireless communication device.

15. The wireless communication device of claim 14, wherein the second symbol in the second portion is a repeat of the first symbol in the second portion.

16. The wireless communication device of claim 14, wherein the last symbol in the first portion includes a first set of code bits, and wherein the first symbol in the second portion includes a second set of code bits, the second set of code bits being based on the first set of code bits.

17. The wireless communication device of claim 16, wherein the second set of code bits are the logical complement of the first set of code bits.

18. The wireless communication device of claim 14, wherein the first portion includes a data rate field and a length field, the data rate field indicating a data rate of 6 Megabits per second (Mbps) and the length field indicating a modulus 3 of 0.

19. The wireless communication device of claim 14, wherein the first portion is a legacy portion including a legacy short training field (L-STF), followed by a legacy long training field (L-LTF) and followed by a legacy signaling field (L-SIG) having a single symbol, the last symbol in the first portion being the single symbol of the L-SIG.

20. A wireless communication device, comprising:
a first low power radio and a second primary radio;
at least one modem;
at least one processor; and
at least one memory communicatively coupled with the at least one processor and storing processor-readable code that, when executed by the at least one processor, causes the wireless communication device to:
receive a packet from a second wireless communication device via the first radio, the packet including:
a physical layer preamble including a first portion and a second portion, the first portion including one or more symbols, the second portion including two or more symbols, each of the one or more symbols in the first portion being modulated according to a binary phase shift keying (BPSK) modulation scheme, a first two symbols in the second portion immediately following a last symbol in the first portion being modulated according to a BPSK modulation scheme, and
a physical layer payload including a plurality of symbols, the plurality of symbols in the payload being modulated according to a multicarrier on-off keying (MC-OOK) modulation scheme; and
determine a packet type of the packet based at least in part on the modulation in the first portion and the modulation in the second portion.

21. The wireless communication device of claim 20, wherein the determination of the packet type is further based on the modulation of the physical layer payload.

22. The wireless communication device of claim 20, wherein a second symbol in the second portion is identical to the first symbol in the second portion.

23. The wireless communication device of claim 20, wherein the last symbol in the first portion includes a first set of code bits, and wherein the first symbol in the second portion includes a second set of code bits, the second set of code bits being based on the first set of code bits.

24. The wireless communication device of claim 23, wherein the second set of code bits are the logical complement of the first set of code bits.

25. The wireless communication device of claim 20, wherein the first portion includes a data rate field and a length field, and wherein the determination of the packet type is further based on the data rate field indicating a data rate of 6 Megabits per second (Mbps) or the length field indicating a modulus 3 of 0.

26. The wireless communication device of claim 20, wherein the first portion is a legacy portion including a legacy short training field (L-STF), followed by a legacy long training field (L-LTF) and followed by a legacy signaling field (L-SIG) having a single symbol, the last symbol in the first portion being the single symbol of the L-SIG.

* * * * *